US010645282B2

(12) United States Patent
An et al.

(10) Patent No.: US 10,645,282 B2
(45) Date of Patent: May 5, 2020

(54) ELECTRONIC APPARATUS FOR PROVIDING PANORAMA IMAGE AND CONTROL METHOD THEREOF

(71) Applicant: SAMSUNG ELECTRONICS CO., LTD., Suwon-si (KR)

(72) Inventors: Jin-hyoung An, Hwaseong-si (KR); Jae-il Jung, Seongnam-si (KR); Min-chul Kim, Seoul (KR); Young-kuk Kim, Suwon-si (KR); Yong-jin Kim, Seoul (KR); Sung-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 15/457,091

(22) Filed: Mar. 13, 2017

(65) Prior Publication Data

US 2017/0264821 A1    Sep. 14, 2017

Related U.S. Application Data

(60) Provisional application No. 62/306,871, filed on Mar. 11, 2016.

(30) Foreign Application Priority Data

May 25, 2016  (KR) .................. 10-2016-0063926
Dec. 2, 2016  (KR) .................. 10-2016-0163626

(51) Int. Cl.
*H04N 5/232*  (2006.01)
*H04N 5/247*  (2006.01)
(Continued)

(52) U.S. Cl.
CPC ......... *H04N 5/23238* (2013.01); *G06F 3/013* (2013.01); *H04N 5/2353* (2013.01);
(Continued)

(58) Field of Classification Search
CPC .......... H04N 5/23238; H04N 5/23216; H04N 5/23293; H04N 5/2353; H04N 5/247
See application file for complete search history.

(56) References Cited

U.S. PATENT DOCUMENTS 5,751,259 A   5/1998  Iwamoto
6,943,829 B2  9/2005  Endo et al.
(Continued)

FOREIGN PATENT DOCUMENTS

CN   101377615 A   3/2009
CN   102396215 A   3/2012
(Continued)

OTHER PUBLICATIONS

Communication dated May 23, 2017 by the International Searching Authority in counterpart International Patent Application No. PCT/KR2017/002677 (PCT/ISA/210 and PCT/ISA/237).
(Continued)

*Primary Examiner* — John R Schnurr
(74) *Attorney, Agent, or Firm* — Sughrue Mion, PLLC

(57) ABSTRACT

An electronic apparatus for providing a panorama image and a controlling method thereof are provided. The method includes acquiring photograph setting values of first images photographed respectively through a plurality of cameras, resetting a photograph setting value to be applied to at least one of the plurality of cameras based on the acquired photograph setting values and generating a panorama image comprising second images photographed through the plurality of cameras using the reset photograph setting value.

13 Claims, 14 Drawing Sheets

(51) Int. Cl.
*H04N 5/235* (2006.01)
*H04N 9/09* (2006.01)
*G06F 3/01* (2006.01)

(52) U.S. Cl.
CPC ..... *H04N 5/23216* (2013.01); *H04N 5/23219* (2013.01); *H04N 5/23293* (2013.01); *H04N 5/247* (2013.01); *H04N 9/09* (2013.01)

(56) References Cited

U.S. PATENT DOCUMENTS

| | | | |
|---|---|---|---|
| 8,013,899 B2 | 9/2011 | Gillard et al. | |
| 8,330,797 B2 | 12/2012 | Kim et al. | |
| 8,659,670 B2* | 2/2014 | Liang | H04N 5/145 348/208.4 |
| 9,583,133 B2 | 2/2017 | Hirata et al. | |
| 2003/0234866 A1* | 12/2003 | Cutler | G06T 5/008 348/207.1 |
| 2004/0201708 A1* | 10/2004 | Endo | H04N 5/232 348/211.1 |
| 2005/0200717 A1 | 9/2005 | Endo et al. | |
| 2006/0017807 A1 | 1/2006 | Lee et al. | |
| 2008/0266412 A1 | 10/2008 | Park et al. | |
| 2009/0058990 A1 | 3/2009 | Kim et al. | |
| 2010/0265342 A1 | 10/2010 | Liang et al. | |
| 2011/0001824 A1 | 1/2011 | Chang | |
| 2012/0169842 A1 | 7/2012 | Chuang et al. | |
| 2013/0002941 A1 | 1/2013 | Park et al. | |
| 2013/0033568 A1 | 2/2013 | Kim et al. | |
| 2014/0232895 A1* | 8/2014 | Schieltz | H04N 5/2353 348/222.1 |
| 2015/0116453 A1* | 4/2015 | Hirata | H04N 5/23245 348/38 |
| 2015/0162048 A1 | 6/2015 | Hirata et al. | |
| 2015/0220143 A1 | 8/2015 | Choi et al. | |
| 2016/0119532 A1* | 4/2016 | Chen | G06T 7/593 348/211.2 |
| 2018/0007315 A1* | 1/2018 | Kim | H04N 5/23222 |
| 2018/0295283 A1* | 10/2018 | Kim | H04N 5/23238 |
| 2018/0300898 A1* | 10/2018 | Eshima | G06T 7/80 |

FOREIGN PATENT DOCUMENTS

| | | |
|---|---|---|
| CN | 104350734 A | 2/2015 |
| EP | 2860963 A1 | 4/2015 |
| JP | 7-281815 A | 10/1995 |
| JP | 2001-148865 A | 5/2001 |
| JP | 2002-251608 A | 9/2002 |
| JP | 2004-193947 A | 7/2004 |
| JP | 2009-147465 A | 7/2009 |
| KR | 1020080101998 A | 11/2008 |
| KR | 10-2011-0003030 A | 1/2011 |
| KR | 1020130002699 A | 1/2013 |
| KR | 1020150068276 A | 6/2015 |
| KR | 1020150091653 A | 8/2015 |
| KR | 1020150125244 A | 11/2015 |
| KR | 1020150125246 A | 11/2015 |

OTHER PUBLICATIONS

Communication dated Jun. 15, 2017 by the Korean Patent Office in counterpart Korean Patent Application No. 10-2016-0163626.
Communication dated Oct. 8, 2018, issued by the European Patent Office in counterpart European Patent Application No. 17763625.5.
Communication dated Dec. 4, 2019 issued by the State Intellectual Property Office of P.R. China in counterpart Chinese Application No. 201780006204.8.

* cited by examiner

ELECTRONIC APPARATUS FOR PROVIDING PANORAMA IMAGE AND CONTROL METHOD THEREOF

CROSS-REFERENCE TO RELATED APPLICATIONS

This application claims priority from Korean Patent Application No. 10-2016-0163626, filed on Dec. 2, 2016, in the Korean Intellectual Property Office, Korean Patent Application No. 10-2016-0063926, filed on May 25, 2016, in the Korean Intellectual Property Office, and U.S. Provisional Patent Application No. 62/306,871, filed on Mar. 11, 2016, in the United States Patent and Trademark Office, the disclosures of which are incorporated herein by reference in their entireties.

BACKGROUND

1. Field

Apparatuses and methods consistent with example embodiments relate to an electronic apparatus and a control method thereof, and more particularly, to technologies consistent with an electronic apparatus configured to provide a panorama image at the electronic apparatus with images photographed through a plurality of cameras, and a control method thereof.

2. Description of the Related Art

A photographing apparatus may composite images photographed through a plurality of cameras into a panorama image, but in compositing the images from the plurality of cameras, the photographing apparatus may not perform color and exposure compensations of the images captured through the respective cameras. This leads into differences in brightness, colors, etc. at interface surfaces among a plurality of constituent images of the panorama image, thus resulting in an unnatural panorama image.

To improve such a problem of differences in brightness and color at the interface surfaces of the constituent images of the panorama image, the related technology compensates the images photographed through a plurality of cameras, based on preset photograph setting values. In the above case, the problem of differences in the brightness and color generated at the interface surfaces among the plurality of constituent images of the panorama image may be addressed, but at the cost of overall image quality of the panorama image.

SUMMARY

Example embodiments of the present inventive concept may overcome the above disadvantages and other disadvantages not described above. Also, the present inventive concept is not required to overcome the disadvantages described above, and an example embodiment of the present inventive concept may not overcome any of the problems described above.

Example embodiments provide, at an electronic apparatus, a panorama image or virtual reality (VR) image such as a 360 degree around view with improved overall image quality, from images photographed through a plurality of cameras.

According to an aspect of an example embodiment, there is provided a method of an electronic apparatus for providing a panorama image, the method including acquiring photograph setting values of first images photographed respectively through a plurality of cameras, resetting a photograph setting value to be applied to at least one of the plurality of cameras based on the acquired photograph setting values and generating a panorama image comprising second images photographed through the plurality of cameras using the reset photograph setting value.

The resetting may include resetting the photograph setting values to be respectively used by the plurality of cameras by an average value of the photograph setting values of the plurality of cameras.

The method may further include, based on a selection of an icon for a reference camera setting, displaying a list comprising objects respectively corresponding to the plurality of cameras, and wherein the resetting comprises, based on a selection of an object from the objects, resetting each of photograph setting values of other cameras by a photograph setting value of a camera corresponding to the selected object.

The resetting may include resetting a photograph setting value acquired from a first camera among the plurality of cameras as a first photograph setting value, and resetting a photograph setting value acquired from a second camera as a second photograph setting value.

The acquiring may include acquiring, at a preset time interval, the photograph setting values respectively from image frames of a video that is photographed through the plurality of cameras.

The method may further include sensing a motion of the electronic apparatus, and reacquiring the photograph setting values respectively from the image frames of the photographed video, based on the sensed motion of the electronic apparatus.

The method may further include determining whether a difference between the photograph setting values acquired from the plurality of cameras is outside a preset threshold range, wherein the resetting comprises, in response to the determining that the difference between the acquired photograph setting values is outside the preset threshold range, resetting the photograph setting value to be applied to at least one of the plurality of cameras, based on the photograph setting values acquired from the plurality of cameras.

The photograph setting value comprises either one or both of a photograph exposure value and a photograph color value.

The acquiring may include acquiring, by an image signal processor (ISP), the photograph setting values of the plurality of cameras, wherein the resetting comprises resetting, by a digital signal processor (DSP), the photograph setting value to be applied to at least one of the plurality of cameras based on the acquired photograph setting values, and wherein the method further comprises photographing, by the camera, the second images using the reset photograph setting value, based on a control command received from the ISP.

According to an aspect of another example embodiment, there is provided an electronic apparatus for providing a panorama image, the electronic apparatus including a plurality of cameras configured to photograph first images, and a processor configured to acquire photograph setting values of the images photographed respectively through the plurality of cameras, reset a photograph setting value to be applied to at least one of the plurality of cameras based on the acquired photograph setting values, the photograph setting value comprising either one or both of a photograph exposure value and a photograph color value, control the plurality of cameras to photograph second images based on the reset photograph setting value, and generate a panorama image comprising the photographed second images, wherein the photograph setting value comprises at least one of photograph exposure value and a photograph color value.

The processor may be configured to reset the photograph setting values to be respectively used by the plurality of cameras by an average value of the photograph setting values of the plurality of cameras.

The electronic apparatus nay further include a display configured to, based on a selection of an icon for a reference camera setting, display a list comprising objects respectively corresponding to the plurality of cameras, wherein the processor is further configured to, based on a selection of an object from the objects, reset each of photograph setting values of other cameras by a photograph setting value of a camera corresponding to the selected object.

The processor may be further configured to reset a photograph setting value acquired from a first camera among the plurality of cameras as a first photograph setting value, and reset a photograph setting value acquired from a second camera as a second photograph setting value.

The processor may be further configured to acquire, at a preset time interval, the photograph setting values respectively from image frames of a video photographed through the plurality of cameras.

The electronic apparatus may further include a sensor configured to sense a motion of the electronic apparatus, wherein the processor is further configured to reacquire the photograph setting values respectively form the image frames of the photographed video, based on the sensed motion of the electronic apparatus.

The processor may be further configured to determine whether a difference between the photograph setting values acquired from the plurality of cameras is outside a preset threshold range, and in response to the determination that the difference between the acquired photograph setting values is outside the preset threshold range, reset the photograph setting value to be applied to at least one of the plurality of cameras, based on the photograph setting values acquired form the plurality of cameras.

The processor may include an image signal processor (ISP) configured to acquire the photograph setting values of the plurality of cameras and signal-process image data for the photographed images, and a digital signal processor (DSP) configured to reset the photograph setting value of at least one of the plurality of cameras based on the acquired photograph setting values, wherein the ISP is further configured to control the plurality of cameras to photograph the second images based on the reset photograph setting values.

According to an aspect of another example embodiment, there is provided an electronic apparatus for providing a panorama image in a virtual reality environment, the electronic apparatus for providing a panorama image in a virtual reality environment, the electronic apparatus including a display configured to display a first panorama image comprising images, a sensor configured to sense a gaze of a user, and a processor configured to determine an area of the first panorama image that the user is gazing at, based on the sensed gaze, and generate a second panorama image by processing the other images with an image setting value of an image corresponding to the determined area, among the images.

The processor may be further configured to when the area of the displayed first panorama image that the user is gazing at is determined to be a first area, generate the second panorama image by processing a second image of the first panorama image by using the image setting value of a first image corresponding to the first area.

The processor may be further configured to when the area of the displayed first panorama image that the user is gazing at is determined to have been moved a first area to a second area, generate the second panorama image by processing a second image corresponding to the determined second area by using the image setting value of a first image corresponding to the first area to which the determined area is moved.

As described above, according to exemplary embodiments of the present disclosure, the electronic apparatus can generate a natural overall panorama image from the images photographed at a plurality of cameras. Furthermore, according to exemplary embodiments, a plurality of cameras may each photograph the images based on the compensated photograph setting values. Accordingly, compared to the related image processing procedure, the electronic apparatus can provide a simpler procedure of generating a panorama image by compensating a plurality of images.

BRIEF DESCRIPTION OF THE DRAWINGS

The above and/or other aspects of the present inventive concept will be more apparent by describing example embodiments of the present inventive concept with reference to the accompanying drawings, in which.

DETAILED DESCRIPTION OF EXAMPLE EMBODIMENTS

Figure 1A:
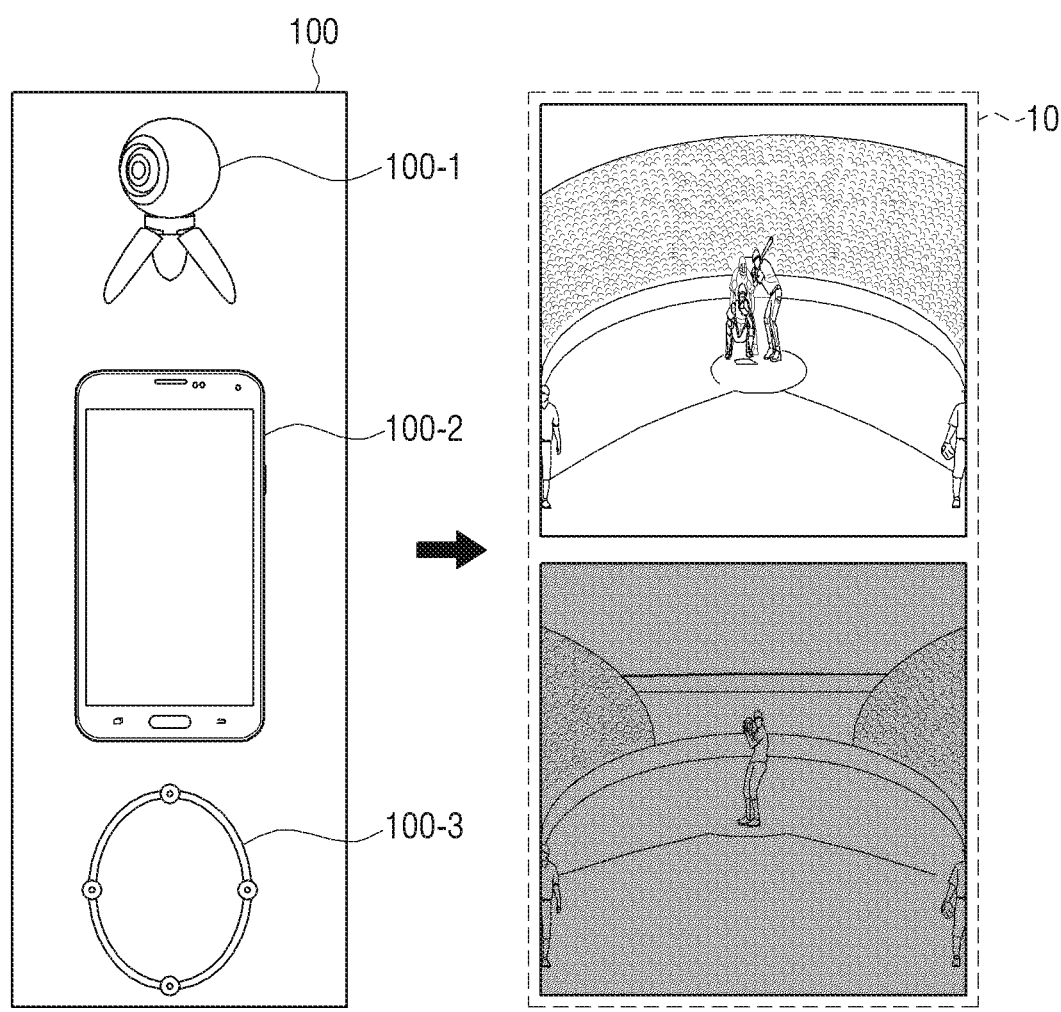
FIG. 1A is a view of an electronic apparatus according to an example embodiment.

Prior to describing example embodiments in detail, the manner in which the description and the drawings are described will be first explained. First, terms used in the specification and claims are chosen from general terms currently and widely used while considering functions of the present disclosure, although these may be different according to intention of a person skilled in the art, precedents, and emergence of new technology. Further, in cases, terms may be arbitrarily defined by an applicant. Such terms may be interpreted as defined herein, or unless defined otherwise, the terms used herein may be interpreted based on the overall description and the general technical knowledges in the related art.

Further, the same reference numerals or symbols used in the respective drawings accompanied hereto refer to components or elements configured to perform substantially the same functions. For convenience of explanation and understanding, the same reference numerals or symbols are used in the description of different example embodiments. That is, even when the elements are illustrated with the same reference numerals in different drawings, this does not necessarily mean that a plurality of drawings refer to one single embodiment.

Further, to distinguish between elements, the description and claims may use terms including ordinal number such as "first," "second" and so on. The ordinal numbers are used to distinguish the identical or similar elements from one another, and use of such an ordinal number will not be construed as limiting the meaning of the term. In one example, an element combined with an ordinal number may not be limited in the order the element is used or arranged by that number. Respective ordinal numbers may be replaced with one another.

Unless otherwise stated herein, a singular expression encompasses a plural expression. The term such as "comprise" or "composed of" is used herein solely to designate existence of characteristics, numbers, steps, operations, elements, parts, or a combination of these, and not to preclude the existence or possibility of adding one or more of other characteristics, numbers, steps, operations, elements, parts, or a combination of these.

The term such as "module," "unit," "part," and so on is used herein solely to refer to an element that performs at least one function or operation, and such element may be implemented as hardware, or software, or a combination of the hardware and software. Further, unless each are to be implemented as individual hardware, a plurality of "module," "units," or "parts" may be integrated into at least one module or chip to be implemented as at least one processor.

Further, in example embodiments of the present disclosure, when it is stated that a portion is connected to another portion, it encompasses not only the direct connection, but also the indirect connection that may be made via other medium. Further, when it is stated that a portion includes an element, unless stated to the contrary, this means that the portion can additionally include other elements, rather than precluding the other elements.

Hereinbelow, example embodiments will be descried with reference to the accompanied drawings.

Figure 1B:
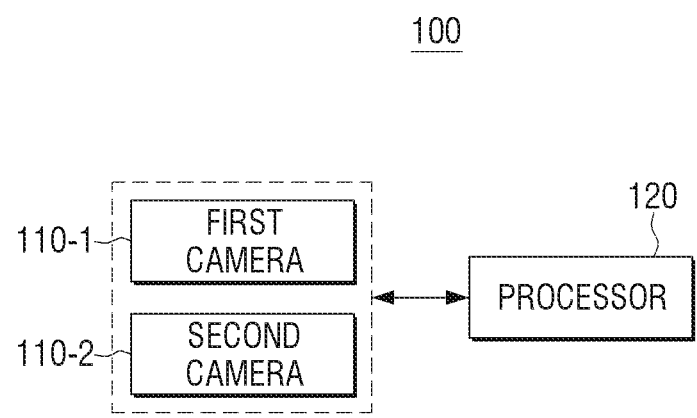
FIG. 1B is a schematic block diagram of an electronic apparatus according to an example embodiment.

FIG. 1A is a view of an electronic apparatus according to an example embodiment, and FIG. 1B is a schematic block diagram of an electronic apparatus according to an example embodiment.

An electronic apparatus 100 is capable of providing a virtual reality (VR) image 10 such as a panorama image or a 360 degree around view, and may be a VR device 100-1, a smartphone 100-2, and a VR wearable device 100-3, as illustrated in FIG. 1A. Referring to FIG. 1B, the electronic apparatus 100 includes two or more cameras 110, and a processor 120 configured to control the overall operations of the components of the electronic apparatus 100.

For convenience of explanation, it is assumed herein that the electronic apparatus 100 includes first and second cameras 110-1, 110-2.

The processor 120 may control image photographing at the first and second cameras 110-1, 110-2, or perform image processing of the images respectively photographed from the first and second cameras 110-1, 110-2.

When images are photographed from the first and second cameras 110-1, 110-2, the processor 120 acquires photograph setting values of the first and second cameras 110-1, 110-2.

The 'photograph setting value' as used herein may refer to either one or both of a photograph exposure value and a photograph color value for photographing the images at the first and second cameras 110-1, 110-2. When the photograph setting values of the first and second cameras 110-1, 110-2 are acquired, the processor 120 resets the photograph setting values to be applied to either one or both of the first and second cameras 110-1, 110-2, based on the acquired photograph setting values for the first and second cameras 110-1, 110-2. Then the processor 120 controls the first and second cameras 110-1, 110-2 to photograph images, based on the reset photograph setting values. In response to such control command, the first and second cameras 110-1, 110-2 photograph images, based on the photograph setting values reset by the processor 120.

Accordingly, the processor 120 may generate a panorama image, using a plurality of images photographed from the first and second cameras 110-1, 110-2, based on the reset photograph setting values.

Before resetting the photograph setting values of the first and second cameras 110-1, 110-2, the first and second cameras 110-1, 110-2 may determine whether or not to reset the photograph setting values of the first and second cameras 110-1, 110-2, based on a similarity between the photograph setting values of the first and second cameras 110-1, 110-2.

The processor 120 determines whether a difference in the photograph setting values acquired from the first and second cameras 110-1, 110-2 is in a preset threshold range. When a result of determination indicates that the difference in the photograph setting values acquired from the first and second cameras 110-1, 110-2 is in a preset threshold range, the processor 120 determines that the photograph setting values of the first and second cameras 110-1, 110-2 is similar, and controls the first and second cameras 110-1, 110-2 to photograph images, based on the photograph setting values previously applied to the first and second cameras 110-1, 110-2.

When the difference in the photograph setting values acquired from the first and second cameras 110-1, 110-2 is not in the preset threshold range, the processor 120 may determine that the photograph setting values of the first and second cameras 110-1, 110-2 are different, and reset the photograph setting values to be applied to the first and second cameras 110-1, 110-2, based on the example embodiments described below.

According to an example embodiment, the processor 120 may reset the photograph setting values of the first and second cameras 110-1, 110-2 with average values of the photograph setting values of the first and second cameras 110-1, 110-2. The photograph setting values as used herein may refer to the photograph exposure values or photograph color values of each of the first and second cameras 110-1, 110-2.

When images are photographed through the first and second cameras 110-1, 110-2, the processor 120 acquires photograph setting values that are set for the first and second cameras 110-1, 110-2 at the time of photographing images. Then the processor 120 may calculate average values from the photograph setting values set for the first and second cameras 110-1, 110-2, and reset the photograph setting values for the first and second cameras 110-1, 110-2 by the calculated values.

For example, when the photograph setting values for the images photographed from the first and second cameras 110-1, 110-2 are acquired, the processor 120 may calculate the average values from the photograph exposure values acquired from the first and second cameras 110-1, 110-2, and reset the photograph exposure values for the first and second cameras 110-1, 110-2 by the calculated average values.

When the photograph setting values for the first and second cameras 110-1, 110-2 are reset, the first and second cameras 110-1, 110-2 photograph the images, based on the reset photograph setting values, in response to a control command from the processor 120. That is, the first and second cameras 110-1, 110-2 may photograph images with the same photograph exposure value or photograph color value, based on the reset photograph setting values. Accordingly, the processor 120 may generate a panorama image or a VR image, using respective images photographed at the first and second cameras 110-1, 110-2, based on the reset photograph setting values.

According to another example embodiment, the processor 120 may reset the photograph setting values for the first and second cameras 110-1, 110-2 with an average value of the highest photograph setting values among the photograph setting values of the first and second cameras 110-1, 110-2, and the average value of the average values of photograph setting values of the first and second cameras 110-1, 110-2.

When the images are photographed through the first and second cameras 110-1, 110-2, the processor 120 acquires the highest photograph setting value among the photograph setting values set for the first and second cameras 110-1, 110-2 at the time of photographing the images. Then the processor 120 calculates an average value from the photograph setting values set for the first and second cameras 110-1, 110-2. After that, the processor 120 calculates an average value of the highest photograph setting value of the photograph setting values of the first and second cameras 110-1, 110-2, and the average value previously calculated from the photograph setting values of the first and second cameras 110-1, 110-2, and resets the photograph setting values for the first and second cameras 110-1, 110-2 by the calculated average value.

For example, the photograph exposure values of the images photographed from the first and second cameras 110-1, 110-2 may be acquired, and the photograph exposure value of the first camera 110-1 may be greater than the photograph exposure value of the second camera 110-2.

In the above example, the processor 120 may reset the photograph exposure value to be applied to the first and second cameras 110-1, 110-2, based on an average value calculated with the photograph exposure value of the first camera 110-1 and a photograph exposure value calculated from the photograph exposure values of the first and second cameras 110-1, 110-2.

When the photograph exposure values of the first and second cameras 110-1, 110-2 are reset, in response to a control command from the processor 120, the first and second cameras 110-1, 110-2 photograph images, based on the reset photograph exposure value. That is, the first and second cameras 110-1, 110-2 may photograph images with the same exposure value or color value, based on the reset photograph exposure value. Accordingly, the processor 120 may generate a panorama image or a VR image, using the respective images photographed from the first and second cameras 110-1, 110-2, based on the reset photograph exposure values.

In another example embodiment, the processor 120 may reset the photograph setting values for the first and second cameras 110-1, 110-2, based on an average value of the lowest photograph setting value of the photograph setting values of the first and second cameras 110-1, 110-2 and an average value of average values of the first and second cameras 110-1, 110-2.

When images are photographed through the first and second cameras 110-1, 110-2, the processor 120 acquires the lowest photograph setting value among the photograph setting values set for the first and second cameras 110-1, 110-2 at the time of photographing the images. Then the processor 120 calculates an average value of the photograph setting values set for the first and second cameras 110-1, 110-2. Then the processor 120 calculates an average of the lowest photograph setting value of the photograph setting values of the first and second cameras 110-1, 110-2 and an average value previously calculated from the photograph setting values of the first and second cameras 110-1, 110-2, and resets the photograph setting information for the first and second cameras 110-1, 110-2 by the calculated average value.

For example, the photograph exposure values of the images photographed from the first and second cameras 110-1, 110-2 may be acquired, and the photograph exposure value of the second camera 110-2 may be less than the photograph exposure value of the first camera 110-1.

In the above example, the processor 120 may reset the photograph exposure value to be applied to the first and second cameras 110-1, 110-2, based on an average value calculated from the photograph exposure value of the second camera 110-2 and the photograph exposure values of the first and second cameras 110-1, 110-2.

When the photograph setting values of the first and second cameras 110-1, 110-2 are reset, in response to a control command from the processor 120, the first and second cameras 110-1, 110-2 photograph images, based on the reset photograph setting values. That is, the first and second cameras 110-1, 110-2 may photograph images with the same exposure value or color value based on the reset photograph setting values. Accordingly, the processor 120 may generate a panorama image or a VR image, using the respective images photographed from the first and second cameras 110-1, 110-2, based on the reset photograph setting value.

In yet another example embodiment, the processor 120 may reset photograph setting values for the rest of the cameras, using the photograph setting value for a camera corresponding to the user command, among the photograph setting values for the first and second cameras 110-1, 110-2.

Figure 7:
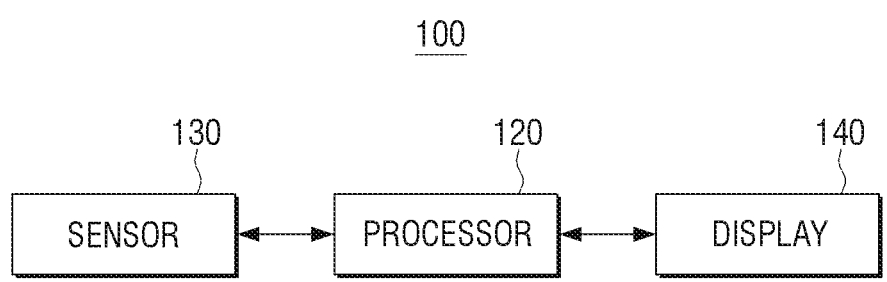
FIG. 7 is a block diagram of an electronic apparatus for providing a virtual reality (VR) environment, according to an example embodiment.

In response to a user command, the processor 120 controls a display 140 of FIG. 7 to display a photograph setting UI including an icon for reference camera setting. Accordingly, the display 140 displays a photograph setting UI including an icon for the reference camera setting. The display 140 for displaying the photograph setting UI will be described in detail below.

With the photograph setting UI being displayed, when an icon for reference camera setting included in the photograph setting UI is selected, the first and second cameras 110-1, 110-2 each control the display 140 to display a list UI including an object corresponding to each of the first and second cameras 110-1, 110-2. In response to the control command, the display 140 displays a list UI including an object corresponding to each of the first and second cameras 110-1, 110-2, on a screen. In response to a command to select one of a plurality of objects included in the list UI displayed on the screen, the processor 120 may reset the photograph setting values for the other cameras, using the photograph setting value for the camera corresponding to the selected object, among the first and second cameras 110-1, 110-2.

For example, when a user selects an object corresponding to the first camera 110-1 among the first and second cameras 110-1, 110-2, the processor 120 may reset the photograph setting value for the second camera 110-2 by the photograph setting value for the first camera 110-1. When the photograph setting value for the second camera 110-2 is reset by the photograph setting value for the first camera 110-1, the first and second cameras 110-1, 110-2 may photograph images with the same exposure or color value. Accordingly, the processor 120 may generate a panorama image or a VR image, using the images respectively photographed from the first and second cameras 110-1, 110-2, based on the reset photograph setting value.

In yet another example embodiment, the processor 120 may reset the photograph setting value acquired from the first camera 110-1 among the first and second cameras 110-1, 110-2 by the first photograph setting value, and reset the photograph setting value acquired from the second camera 110-2 by the second photograph setting value.

When the photograph setting values are acquired from the first and second cameras 110-1, 110-2, the processor 120 calculates an average value from the acquired photograph setting values. Then the processor 120 may reset the photograph setting values to be applied to the first and second cameras 110-1, 110-2 differently, within a preset threshold range with reference to the calculated average value.

For example, the photograph exposure value of the first camera 110-1 may be 5, and the photograph exposure value of the second camera 110-2 may be 10, in which case the average value of 7.5 can be calculated from the photograph exposure values of the first and second cameras 110-1, 110-2.

In the above example, the processor 120 may set a threshold range for the photograph exposure values to be applied to the first and second cameras 110-1, 110-2, based on the average value calculated from the photograph exposure values of the first and second cameras 110-1, 110-2. When the average value of 7.5 is calculated from the photograph exposure values of the first and second cameras 110-1, 110-2 as described above, the processor 120 may set a threshold range for the photograph exposure value to be applied to the first and second cameras 110-1, 110-2 to 7-8. With such a threshold range set, the processor 120 may reset the photograph exposure value to be applied to the first camera 110-1 to 7, and reset the photograph exposure value to be applied to the second camera 110-2 to 8.

In an example embodiment in which the processor 120 resets a photograph exposure value to be applied to either one or both of the first and second cameras 110-1, 110-2, based on the photograph setting values acquired from the first and second cameras 110-1, 110-2, when a video is photographed through the first and second cameras 110-1, 110-2, the processor 120 may acquire the photograph setting values set for the first and second cameras 110-1, 110-2, based on the example embodiments to be described below.

In an example embodiment, when a video is photographed through the first and second cameras 110-1, 110-2, the processor 120 may acquire the photograph setting values from the image frames of the video photographed through the first and second cameras 110-1, 110-2 when a preset time period elapses.

For example, when the time period is set by 10 second interval, the processor 120 may acquire photograph setting values of the first and second cameras 110-1, 110-2 from the image frames of the video photographed through the first and second cameras 110-1, 110-2 at 10 second intervals.

Accordingly, when the photograph setting values of the first and second cameras 110-1, 110-2 are acquired at every time period, the processor 120 may reset the photograph setting value to be applied to either one or both of the first and second cameras 110-1, 110-2, based on the photograph setting values acquired from the first and second cameras 110-1, 110-2, as described in the above example embodiments.

In yet another example embodiment, when a video is photographed through the first and second cameras 110-1, 110-2, the processor 120 may determine, based on sensing information sensed through a sensor 130 of FIG. 7 to be described below, whether or not an event of sensing a motion of the electronic apparatus 100 occurs, and acquire again the photograph setting values for the first and second cameras 110-1, 110-2, based on the result of determination.

When photographing the video starts through the first and second cameras 110-1, 110-2, the processor 120 acquires photograph setting values for the first and second cameras 110-1, 110-2 from the image frames of the video photographed through the first and second cameras 110-1, 110-2.

Accordingly, when the photograph setting values are acquired from the first and second cameras 110-1, 110-2, the processor 120 may reset the photograph setting value applied to either one or both of the first and second cameras 110-1, 110-2, based on the photograph setting values acquired from the first and second cameras 110-1, 110-2, as described above.

After the photograph setting values are acquired from the first and second cameras 110-1, 110-2, the processor 120 determines whether an event of sensing a motion of the electronic apparatus 100 occurs or not, based on the sensing information sensed through the sensor 130.

When the result of determination indicates that the event of sensing a motion occurs, the processor 120 may acquire the photograph setting values applied to the first and second cameras 110-1, 110-2, based on the image frames of the video photographed through the first and second cameras 110-1, 110-2 at a time point of determining the occurrence of the event of sensing the motion.

Accordingly, when the photograph setting values applied to the first and second cameras 110-1, 110-2 are additionally acquired in accordance with the event of sensing a motion, the processor 120 may reset the photograph setting value applied to either one or both of the first and second cameras 110-1, 110-2, based on the photograph setting values additionally acquired from the first and second cameras 110-1, 110-2, as described above.

In yet another example embodiment, the processor 120 may acquire photograph setting values applied to the first and second cameras 110-1, 110-2, by combining the example embodiments described above.

When the video is photographed through the first and second cameras 110-1, 110-2 as described above, the processor 120 may acquire the photograph setting values from the image frames of the video photographed through the first and second cameras 110-1, 110-2 at a preset time interval. After the photograph setting values are acquired from the first and second cameras 110-1, 110-2, the processor 120 determines whether or not an event of sensing a motion of the electronic apparatus 100 occurs, based on the sensing information sensed through the sensor 130.

When the result of determination indicates that an event of sensing a motion of the electronic apparatus 100 occurs, the processor 120 shortens the preset time interval. Accordingly, the processor 120 may acquire the photograph setting values from the image frames of the video photographed through the first and second cameras 110-1, 110-2 at a time interval that is set to be shorter than the previous interval.

When the result of determination indicates that an event of sensing a motion of the electronic apparatus 100 has not occurred for a preset threshold time, the processor 120 increases the preset time interval. Accordingly, the processor 120 may additionally acquire the photograph setting values from the image frames of the video photographed through the first and second cameras 110-1, 110-2 at a time interval that is set to be longer than the previous time interval.

When the photograph setting values applied to the first and second cameras 110-1, 110-2 are additionally acquired in accordance with the time interval that is varied in response to occurrence of an event of sensing a motion, the processor 120 may reset the photograph setting value applied to either one or both of the first and second cameras 110-1, 110-2, based on the photograph setting values additionally acquired from the first and second cameras 110-1, 110-2, as described above.

When the photograph setting value of either one or both of the first and second cameras 110-1, 110-2 is reset as described above, images with the same exposure value or color value can be photographed based on the reset photograph setting value. Accordingly, the processor 120 can generate a panorama image or a VR image, using the images respectively photographed from the first and second cameras 110-1, 110-2, based on the reset photograph setting values.

As described above, by resetting the photograph setting values for the first and second cameras 110-1, 110-2, based on example embodiments including those described above, the processor 120 can minimize an error in the exposure value or color value among the images photographed from the first and second cameras 110-1, 110-2. Moreover, the processor 120 may generate a natural overall panorama image or VR image, by generating a panorama image or VR image using the images photographed from the first and second cameras 110-1, 110-2, based on the reset photograph setting values.

Figure 2:
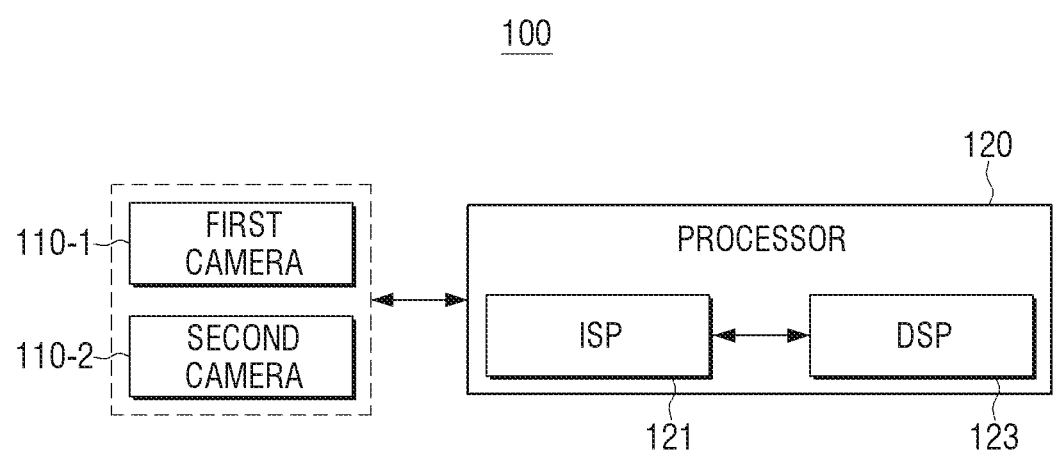
FIG. 2 is a detailed block diagram of a processor according to an example embodiment.

In example embodiments described above in which the processor 120 resets the photograph setting values for the first and second cameras 110-1, 110-2 and generates a panorama image or VR image by using the images photographed through the first and second cameras 110-1, 110-2, based on the reset photograph setting values, the processor 120 may include an image signal processor (ISP) 121, and a digital signal processor (DSP) 123, as shown in FIG. 2.

FIG. 2 is a detailed block diagram of a processor according to an example embodiment.

As illustrated in FIG. 2, the processor 120 includes the ISP 121, and the DSP 123.

The ISP 121 controls a photographing operation of the first and second cameras 110-1, 110-2, based on the photograph setting values previously set for the first and second cameras 110-1, 110-2, respectively. As illustrated, when the ISP 121 is composed of only one single ISP, the ISP 121 may control the photographing operation of the first and second cameras 110-1, 110-2 while alternating between the first and second cameras 110-1, 110-2.

Then the ISP 121 signal-processes the image data for the images photographed from the first and second cameras 110-1, 110-2. Further, the ISP 121 may acquire the photograph setting values of the images photographed from the first and second cameras 110-1, 110-2.

When a video is photographed through the first and second cameras 110-1, 110-2, the ISP 121 may acquire photograph setting values of the images photographed from the first and second cameras 110-1, 110-2, based on the example embodiments described below.

The 'photograph setting value' as used herein may refer to a photograph exposure value or a photograph color value of the image photographed from the first and second cameras 110-1, 110-2.

The first and second cameras 110-1, 110-2 may include a lens, a shutter, an iris, a solid state imaging device, an analog front end (AFE), and an image sensor. The shutter regulates the time of a reflective light from the object entering the image sensor, and the iris regulates a quantity of light entering the lens by mechanically increasing or decreasing the size of an aperture where the light enters. The solid state imaging device outputs a photocharge image into electric signals, when the reflective light from the object is accumulated into photocharges. The AFE samples and digitizes the electric signals outputted from the solid state imaging device.

Accordingly, the ISP 121 signal-processes the electric signals for the photographed images outputted through the first and second cameras 110-1, 110-2, into digital signals. Using the respective components described above, the first and second cameras 110-1, 110-2 may generate photograph parameters for the photographed images, including exposure time information, ISP information, brightness information, color information, white balance information, and so on, and output the generated photograph parameters to the ISP 121.

Accordingly, by referring to the photograph parameters generated from the first and second cameras 110-1, 110-2, the ISP 121 may acquire photograph setting values including photograph exposure value, photograph color value, and so on, for the images photographed from the first and second cameras 110-1, 110-2.

In an example embodiment, when a video is photographed through the first and second cameras 110-1, 110-2, the ISP 121 may acquire photograph setting values from the image frames of the video photographed through the first and second cameras 110-1, 110-2 at a preset time interval.

In another example embodiment, when a video is photographed through the first and second cameras 110-1, 110-2, in response to an event of sensing a motion of the electronic apparatus 100, based on the sensing information sensed through the sensor 130, the ISP 121 may acquire the photograph setting values from the image frames of the video photographed through the first and second cameras 110-1, 110-2 at a time point of the occurrence of the event.

The DSP 123 generates photographed images for each of the first and second cameras 110-1, 110-2, from the image data digitized through the ISP 121.

As described above, the ISP 121 amplifies the converted electric signals from each of the first and second cameras 110-1, 110-2 according to a given gain, converts each of the electric analog signals into a digital signal, and outputs the resultant signal to the DSP 123.

Accordingly, the DSP 123 may generate photographed images from the first and second cameras 110-1, 110-2, based on the respective digitized image data, and generate a panorama image or VR image, using the generated respective images.

The DSP 123 may receive not only the digitized image data corresponding to each of the first and second cameras 110-1, 110-2, but also photograph setting values preset for each of the first and second cameras 110-1, 110-2.

Accordingly, the DSP 123 may reset photograph setting value for either one or both of the first and second cameras 110-1, 110-2, based on the photograph setting values preset for each of the first and second cameras 110-1, 110-2.

As described above with reference to example embodiments, the DSP 1233 may reset photograph setting values for the first and second cameras 110-1, 110-2 by the average value of the photograph setting values of the first and second cameras 110-1, 110-2.

In another example embodiment, the DSP 123 may reset the photograph setting values for the first and second cameras 110-1, 110-2, by using an average value calculated from the highest photograph setting value among the photograph setting values of the first and second cameras 110-1, 110-2 and an average value of the photograph setting values of the first and second cameras 110-1, 110-2.

In yet another example embodiment, the DSP 123 may reset the photograph setting values for the first and second cameras 110-1, 110-2, by using an average value calculated from the lowest photograph setting value among the photograph setting values of the first and second cameras 110-1, 110-2 and an average value of the photograph setting values of the first and second cameras 110-1, 110-2.

In yet another example embodiment, the DSP 123 may reset the photograph setting values for the other cameras by using the photograph setting value of the camera that is chosen by the user among the first and second cameras 110-1, 110-2.

In yet another example embodiment, the DSP 123 may reset the photograph setting value acquired from the first camera 110-1 as the first photograph setting value, and reset the photograph setting value of the second camera 110-2 as the second photograph setting value.

Accordingly, when the photograph setting value to be applied to either one or both of the first and second cameras 110-1, 110-2 is reset, the ISP 121 controls the first and second cameras 110-1, 110-2 to photograph a plurality of images, based on the reset photograph setting values.

Accordingly, in response to a control command from the ISP 121, the first and second cameras 110-1, 110-2 photograph images, based on the reset photograph setting values, and the ISP 121 performs a series of operations described above to process the signals of the image data for the images photographed from the first and second cameras 110-1, 110-2. Then the ISP 121 transmits the processed image data of each of the first and second cameras 110-1, 110-2 to the DSP 123. Accordingly, the DSP 123 may generate images by image-processing the signal-processed image data for each of the first and second cameras 110-1, 110-2, and generate a panorama image or VR image by compositing the plurality of generated images.

Figure 3:
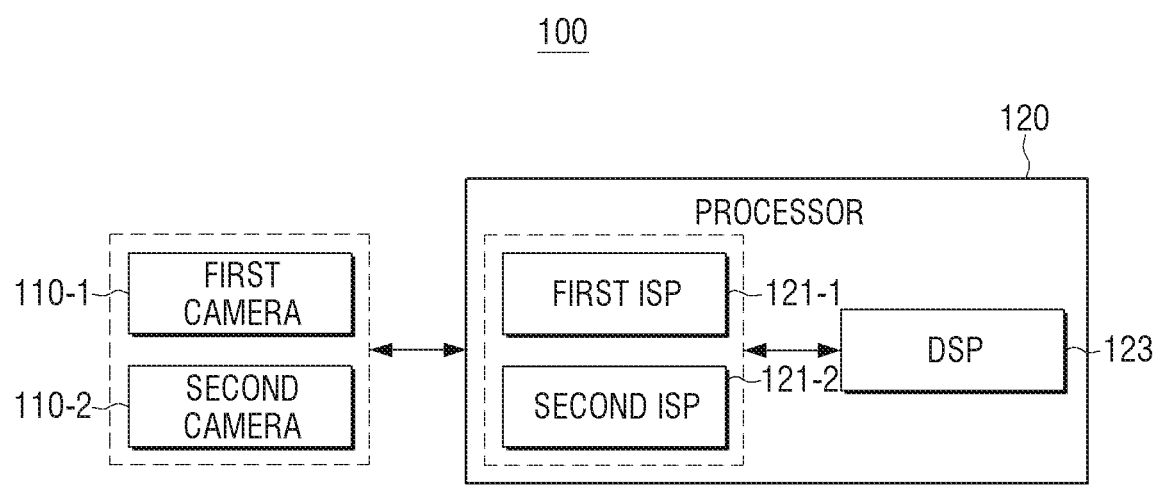
FIG. 3 is a first detailed block diagram of a processor including a plurality of ISPs, according to an example embodiment.
Figure 4:
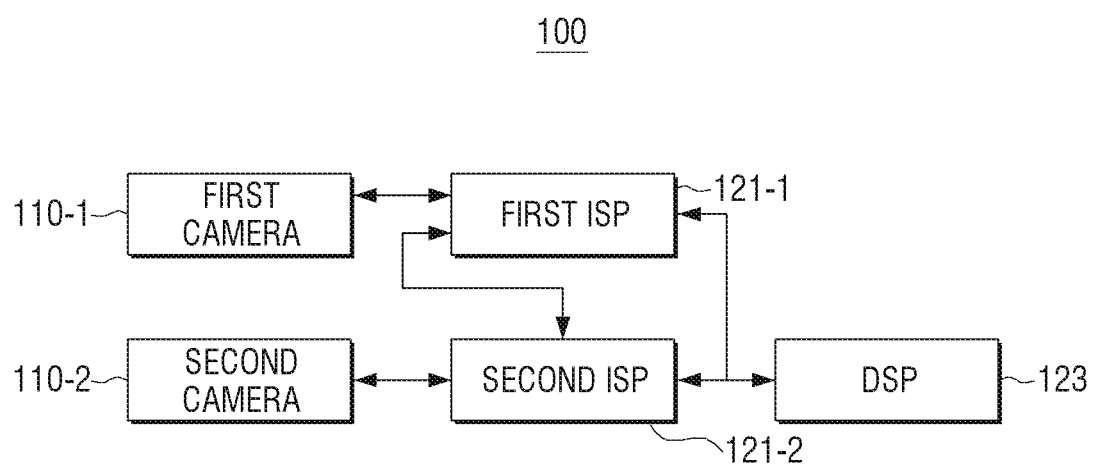
FIG. 4 is a second detailed block diagram of a processor including a plurality of ISPs, according to another example embodiment.

As described above, the ISP 121 for controlling the photographing operation of the first and second cameras 110-1, 110-2 may be composed of a plurality of ISPs, as illustrated in FIGS. 3 and 4.

FIG. 3 is a first detailed block diagram of a processor including a plurality of ISPs, according to an example embodiment, and FIG. 4 is a second detailed block diagram of a processor including a plurality of ISPs, according to another example embodiment.

As illustrated in FIGS. 3 and 4, the processor 120 includes first and second ISPs 121-1, 121-2, and a DSP 123. The first and second ISPs 121-1, 121-2 provided herein may correspond in number to the number of first and second cameras 110-1, 110-2. That is, the processor 120 may include first and second ISPs respectively corresponding to the first and second cameras 110-1, 110-2, and the DSP 123.

Each of the first and second ISPs controls the photographing operation of the corresponding first and second cameras 110-1, 110-2, signal-process the image data for the images photographed from the first and second cameras 110-1, 110-2, and outputs the resultant data to the DSP 123. Accordingly, the DSP may generate images by performing image-processing on the signal-processed image data from the first and second ISPs, and generate a panorama image from a plurality of generated images.

Each of the first and second ISPs may acquire photograph setting values of the first and second cameras 110-1, 110-2 corresponding to each of first and second ISPs, in addition to the signal-processed image data, and output these to the DSP 123. Accordingly, the DSP resets the photograph setting value to be applied to either one or both of the first and second cameras 110-1, 110-2, by using the photograph setting values of the first and second cameras 110-1, 110-2 acquired from the first and second ISPs.

An example embodiment in which the DSP 123 resets the photograph setting value to be applied to either one or both of the first and second cameras 110-1, 110-2, based on the photograph setting values of the first and second cameras 110-1, 110-2, will not be redundantly described below, as this has already been described above in detail.

When the photograph setting value to be applied to either one or both of the first and second cameras 110-1, 110-2 is reset, the DSP 123 outputs the reset photograph setting value to either one or both of the first and second ISPs. Accordingly, the first and second ISPs control the first and second cameras 110-1, 110-2 to photograph images, based on the rest photograph setting values.

In an example embodiment, the DSP 123 may transmit the reset photograph setting values to each of the first and second ISPs, as illustrated in FIG. 3.

In the above example, the first and second ISPs may control the first and second cameras 110-1, 110-2 to photograph images, based on the photograph setting values reset by the DSP 123.

In another example embodiment, the DSP 123 may transmit the reset photograph setting value to one preset ISP of the first and second ISPs, as illustrated in FIG. 4. The 'one preset ISP' as used herein may refer to a master ISP, and the other ISP may be a slave ISP.

For example, the first ISP 121-1 among the first and second ISPs may be set as a master ISP. In this example, the DSP 123 may transmit the reset photograph setting value to the first ISP 121-1 set as the master ISP, and the first ISP 121-1 set as the master ISP may transmit the photograph setting value transmitted from the DSP 123 to the second ISP 121-1 set as the slave ISP. Then the first ISP 121-1 set as the master ISP and the second ISP 121-2 set as the slave ISP control the first and second cameras 110-1, 110-2 to photograph the images, based on the photograph setting values reset from the DSP 123.

Accordingly, the first and second cameras 110-1, 110-2 photograph images, based on the reset photograph setting values, and the first and second ISPs perform a series of operations described above to signal-process the image data for the images photographed from the first and second cameras 110-1, 110-2. Then the first and second ISPs transmit the signal-processed image data from the first and second cameras 110-1, 110-2 to the DSP 123, respectively. Accordingly, the DSP 123 may generate images by performing image-processing for the image data for each of the first and second cameras 110-1, 110-2 that is signal-processed from the first and second ISPs, and generate a panorama image or VR image by compositing a plurality of generated images.

The operations at the electronic apparatus 100 according to an example embodiment, for resetting photograph setting values of the first and second cameras 110-1, 110-2, and generating a panorama image or VR image by using images photographed from the first and second cameras 110-1, 110-2, based on the reset photograph setting values, have been described in detail.

The operations at the electronic apparatus 100 according to an example embodiment, for generating a panorama image or VR image by using images photographed through the first and second cameras 110-1, 110-2, will now be described in detail below.

Figure 5:
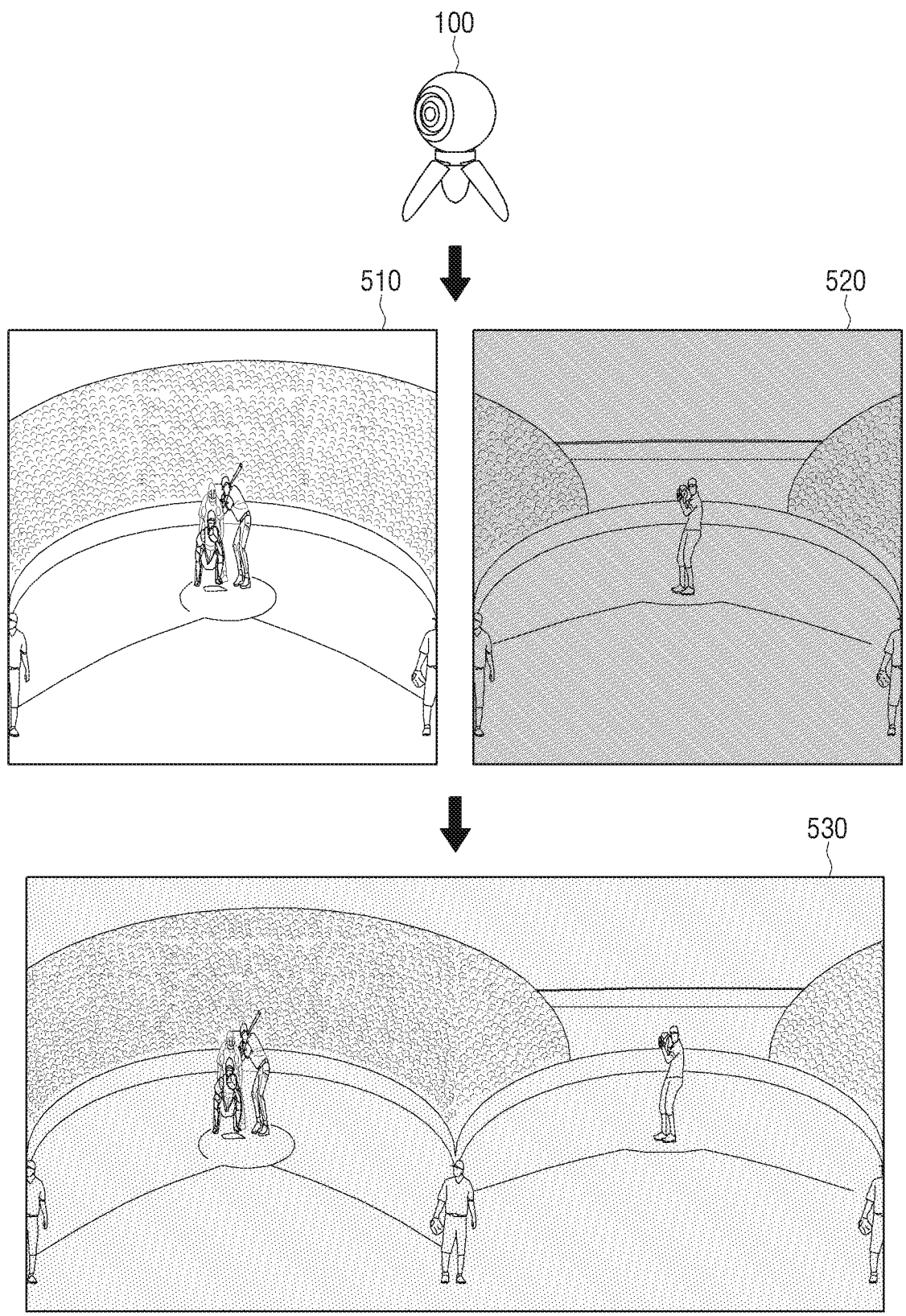
FIG. 5 is a view illustrating a VR image generated at an electronic apparatus with images photographed through a plurality of cameras, according to an example embodiment.

FIG. 5 is a view illustrating a VR image generated at an electronic apparatus with images photographed through a plurality of cameras, according to an example embodiment.

As illustrated in FIG. 5, the electronic apparatus 100 is capable of generating a VR image, which is a 360 degree around view image. That is, the electronic apparatus 100 is capable of generating a VR image by using images photographed through the first and second cameras 110-1, 110-2.

When first and second images 510, 520 are photographed through the first and second cameras 110-1, 110-2, the electronic apparatus 100 acquires photograph setting values of the first and second images 510, 520 photographed through the first and second cameras 110-1, 110-2.

As illustrated, when the first camera 110-1 has a greater exposure value than the second camera 110-2, the first image 510 photographed through the first camera 110-1 and the second image 520 photographed through the second camera 110-2 may be photographed with different brightness tones from each other.

Accordingly, the electronic apparatus 100 resets the photograph setting value to be applied to either one or both of the first and second cameras 110-1, 110-2, by using the photograph setting values acquired from the first and second images 510, 520 photographed through the first and second cameras 110-1, 110-2.

As described above with reference to example embodiments, the electronic apparatus 100 may calculate an average value of the photograph setting values of the first and second cameras 110-1, 110-2, and reset the photograph setting value to be applied to the first and second cameras 110-1, 110-2 by the calculated average value. Accordingly, the first and second cameras 110-1, 110-2 may photograph images having the same exposure value or color value, based on the reset photograph setting value. Accordingly, the electronic apparatus 100 can generate a VR image 530 by using the respective images photographed from the first and second cameras 110-1, 110-2, based on the reset photograph setting value.

That is, the first and second cameras 110-1, 110-2 can photograph images having the same exposure value or color value, based on the reset photograph setting value, and the electronic apparatus 100 can generate the VR image 530 by using the images having the same exposure value or color value that are photographed through the first and second cameras 110-1, 110-2.

Figure 6A:
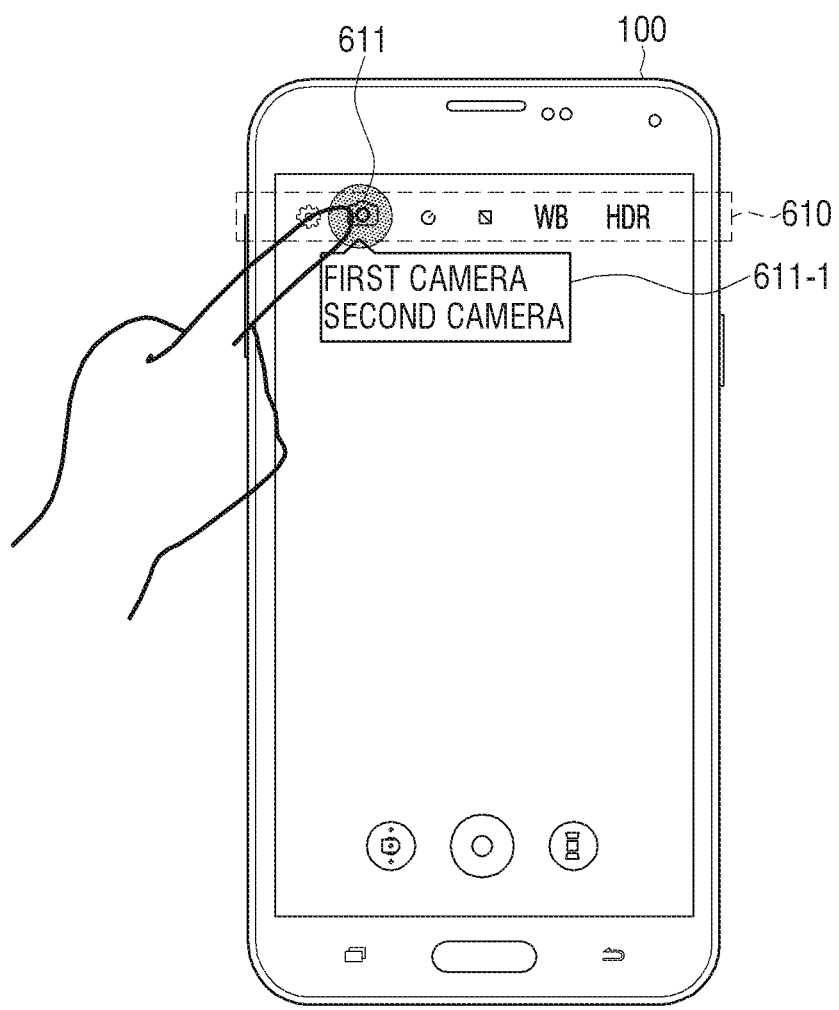
FIGS. 6A and 6B are views illustrating resetting, at an electronic apparatus, photograph setting values for other cameras, based on photograph setting values for a camera corresponding to user command, according to an example embodiment.
Figure 6B:
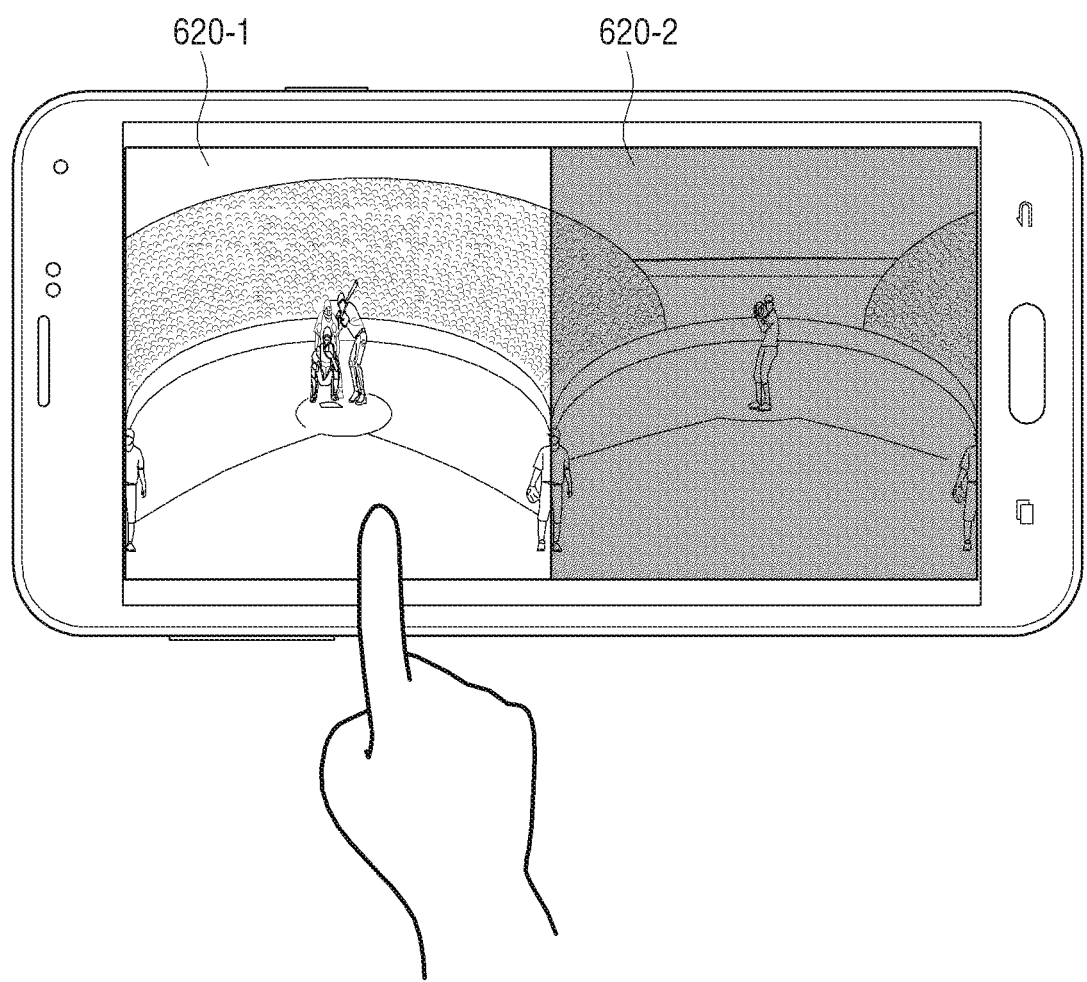

FIGS. 6A and 6B are views illustrating resetting, at an electronic apparatus, photograph setting values for other cameras, based on photograph setting values for a camera corresponding to user command, according to an example embodiment.

As illustrated in FIG. 6A, the electronic apparatus 100 displays a photograph setting UI 610 including a plurality of icons for controlling photographing settings of the first and second cameras 110-1, 110-2. In response to a user command to select an icon 611 for setting a reference camera setting among a plurality of icons included in the photograph setting UI 610, the electronic apparatus 100 displays a list UI 611-1 including objects respectively corresponding to the first and second cameras 110-1, 110-2 in an area adjacent to the area on which the icon 611 for reference camera setting is displayed.

When one of a plurality of objects include in the list UI 611-1 is selected from the displayed list UI 611-1, the electronic apparatus 100 may reset the photograph setting values for the other cameras by the photograph setting value of the camera corresponding to the selected object.

For example, when an object corresponding to the first camera 110-1 is selected from a plurality of objects included in the list UI 611-1, the electronic apparatus 100 may reset the photograph setting value for the second camera 110-2 by the photograph setting value for the first camera 110-1.

Accordingly, the second camera 110-2 may photograph images with the same exposure value or color value as the first camera 110-1 based on the reset photograph setting value, and the electronic apparatus 100 can generate a panorama image or VR image by using the images having the same exposure value or color value that are photographed through the first and second cameras 110-1, 110-2.

As illustrated in FIG. 6B, the electronic apparatus 100 may display first and second images 620-1, 620-2 photographed through the first and second cameras 110-1, 110-2 in the first and second areas of the screen, and reset the photograph setting value for the rest of cameras, based on the photograph setting value of the camera that photographs the image corresponding to the user command.

In an example embodiment, when the first and second images 620-1, 620-2 photographed through the first and second cameras 110-1, 110-2 are displayed in the first and second areas of the screen, the electronic apparatus 100 may reset the photograph setting values of the other cameras by the photograph setting value of the camera that photographed the image selected from the first and second images 620-1, 620-2 displayed on the first and second areas.

For example, the user may select the first image 620-1 displayed on the first area of the screen, among the first and second images 620-1, 620-2 displayed on the first and second areas of the screen. In response to such user command, the electronic apparatus 100 may reset the photograph setting value of the second camera 110-2 by the photograph setting value of the first camera 110-1 that photographed the first image 620-1.

In another example embodiment, when the first and second images 620-1, 620-2 photographed through the first and second cameras 110-1, 110-2 are displayed on the first and second areas of the screen, the electronic apparatus 100 may reset the photograph setting values of the first and second cameras 110-1, 110-2, according to the user command.

For example, the user may select the first image 620-1 displayed on the first area of the screen among the first and second images 620-1, 620-2 displayed on the first and second areas of the screen, and then select the second image 620-2 displayed on the second area within a preset threshold time.

Accordingly, when the first and second images 620-1, 620-2 are selected within a preset threshold time, the electronic apparatus 100 calculates an average value from the photograph setting values of the first and second cameras 110-1, 110-2 that photographed the first and second images 620-1, 620-2. Then the electronic apparatus 100 may reset the photograph setting values of the first and second cameras 110-1, 110-2 by the calculated average value.

Hereinbelow, the operations at the electronic apparatus 100 for providing a VR environment to provide a panorama image will be described in detail.

FIG. 7 is a block diagram of an electronic apparatus for providing a VR environment, according to an example embodiment.

As illustrated in FIG. 7, the electronic apparatus 100 for providing VR environment includes the display 140, the sensor 130, and the processor 120.

The display 140 displays a panorama image or VR image, which may be composed of a plurality of images. The sensor 130 senses a user's gaze. The sensor 130 may sense a location to which the user's gaze is directed and track the user's gaze from the sensed location to a direction to which the user's gaze is moving. In an example embodiment, the sensor 130 may sense the user's gaze by photographing the iris of the user through a sensor capable of eye-tracking, and tracking a direction to which the iris is moving from the photographed iris location. Technologies to sense the user's gaze are well known and will not be redundantly described herein.

The processor 120 determines which area of the displayed panorama image the user is gazing at, based on the gaze information sensed through the sensor 130. Then the processor 120 may generate an image-processed panorama image, by performing image-processing of the rest of the images, using the image setting value of the image corresponding to the area the user is gazing at among a plurality of constituent images of the displayed panorama image. The 'image setting value' as used herein may refer to pixel values of a plurality of constituent pixels of an image corresponding to the image the user is gazing at, and may be the brightness, luminance, and so on of the image corresponding to the area the user is gazing at.

The image setting value may be included in the metadata corresponding to each of a plurality of constituent images of the displayed panorama image.

Accordingly, the processor 120 may generate a panorama image by performing image processing for the rest images of the panorama image, by using the image setting value included in the metadata corresponding to the image corresponding to the area of the panorama image that the user is gazing at.

In an example embodiment, when determining that the area the user is gazing at is the first area, based on the gaze information sensed through the sensor 130, the processor 120 may perform image processing for the second image that constitutes the panorama image, by using the image setting value included in the metadata of the first image corresponding to the first area among a plurality of constituent images of the panorama image.

In another example embodiment, when determining, based on the gaze information sensed through the sensor 130, that the area the user is gazing at is moved from the first area to the second area, the processor 120 acquires image setting value included in the metadata of the first image corresponding to the first area among a plurality of constituent images of the panorama image. Then, the processor 120 may perform image processing for the second image corresponding to the second area among a plurality of constituent images of the panorama image, by using the acquired image setting value of the first image.

In yet another example embodiment, the processor 120 may determine that the area the user is gazing at is between the first area and the second area, based on the gaze information sensed through the sensor 130. For example, the user may be gazing at the first image and the second image among a plurality of constituent images of the panorama image. When sensing the gaze information for such user's gaze, the processor 120 may determine from the sensed gaze information that the area the user is gazing at is the first area corresponding to the first image and the second area corresponding to the second image. When determining that the area the user is gazing at is the first and second areas respectively corresponding to the first and second images 620-1, 620-2, the processor 120 acquires the image setting value included in the metadata of each of the first and second images 620-1, 620-2. Then the processor 120 may calculate a median value from the image setting values respectively corresponding to the first and second images 620-1, 620-2, and perform image processing for the first and second images 620-1, 620-2 by using the calculated median value.

Then the processor 120 re-constructs the panorama image by using the image of the area, according to the user's gaze among a plurality of constituent images of the panorama image, and the rest of the images that are image-processed based on the image setting value of the corresponding image. Accordingly, the display 140 may display the panorama image reconstructed by the processor 120.

As described above, the processor 120 may compensate the image processing among the image associated with the user's gaze and the neighboring images, by compensating the neighboring images with the image setting value of the image associated with the user's gaze. As a result, it is possible to minimize the sense of difference among a plurality of constituent images of the panorama image. That is, according to an example embodiment, the processor 120 compensates the neighboring images, based on the image, according to the direction of the user's gaze, such that continuity among a plurality of constituent images of the panorama image can be ensured.

Hereinbelow, operations at the electronic apparatus 100, according to an example embodiment, of displaying a panorama image reconstructed according to the user's gaze will be described in detail.

Figure 8:
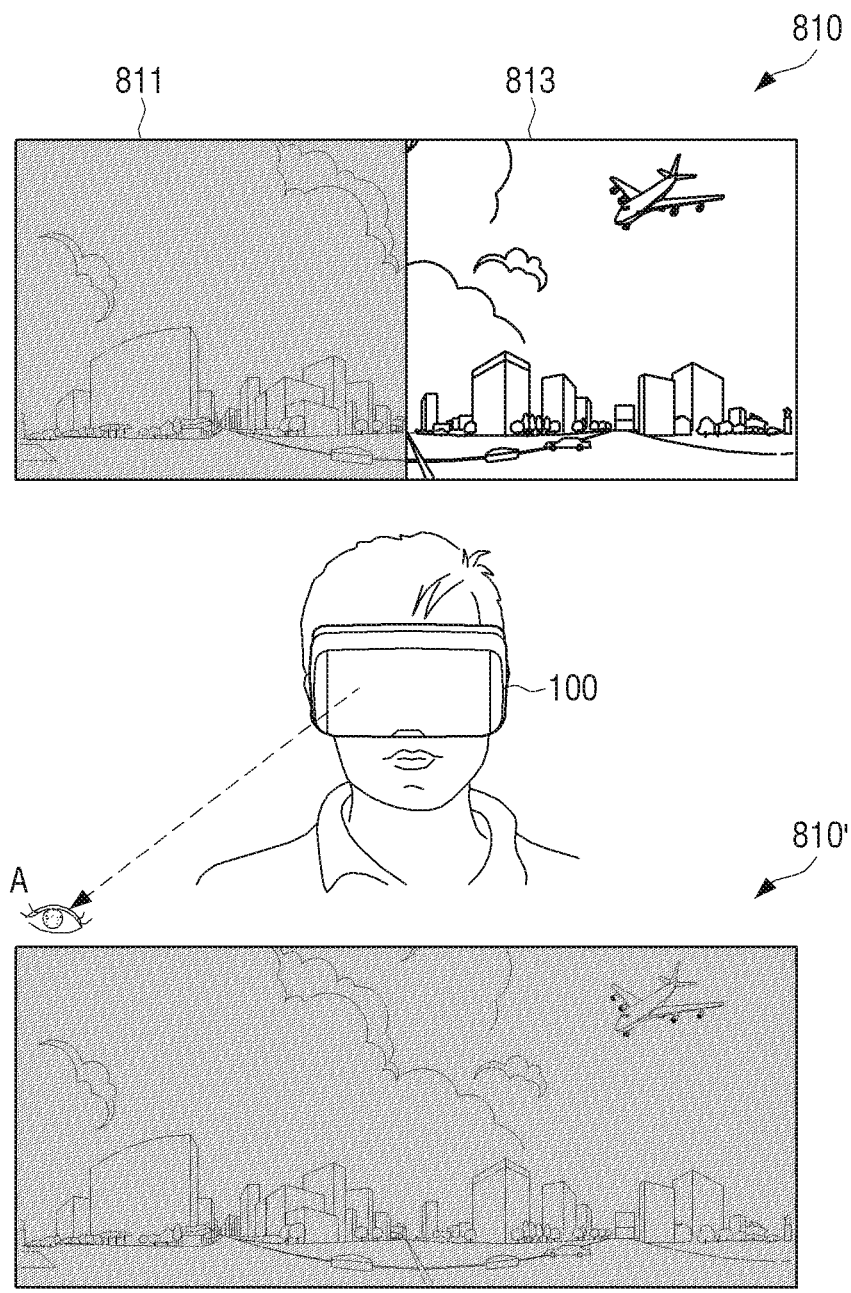
FIG. 8 is a diagram illustrating an electronic apparatus for providing a VR environment, which displays a panorama image reconstructed according to a first gaze of a user, according to an example embodiment.

FIG. 8 is a diagram illustrating an electronic apparatus for providing a VR environment, which displays a panorama image reconstructed according to a first gaze of a user, according to an example embodiment.

As illustrated in FIG. 8, the electronic apparatus 100 for providing a VR environment displays a panorama image 810 including first and second images 811, 813 in response to a user command. While displaying the panorama image 810, the electronic apparatus 100 senses the user's gaze. When the result of sensing indicates that the user is gazing at area A, the electronic apparatus 100 acquires the image setting value of the first image 811 corresponding to the area A the user is gazing at among the first and second constituent images 811, 813 of the panorama image 810. Then the electronic apparatus 100 generates a panorama image by performing image processing on the second constituent image 813 of the panorama image 810, by using the image setting value of the first image 811.

Accordingly, the electronic apparatus 100 displays a panorama image 810' reconstructed with the first image 811 and the second image 813 that is image-processed based on the image setting value of the first image 811.

Figure 9:
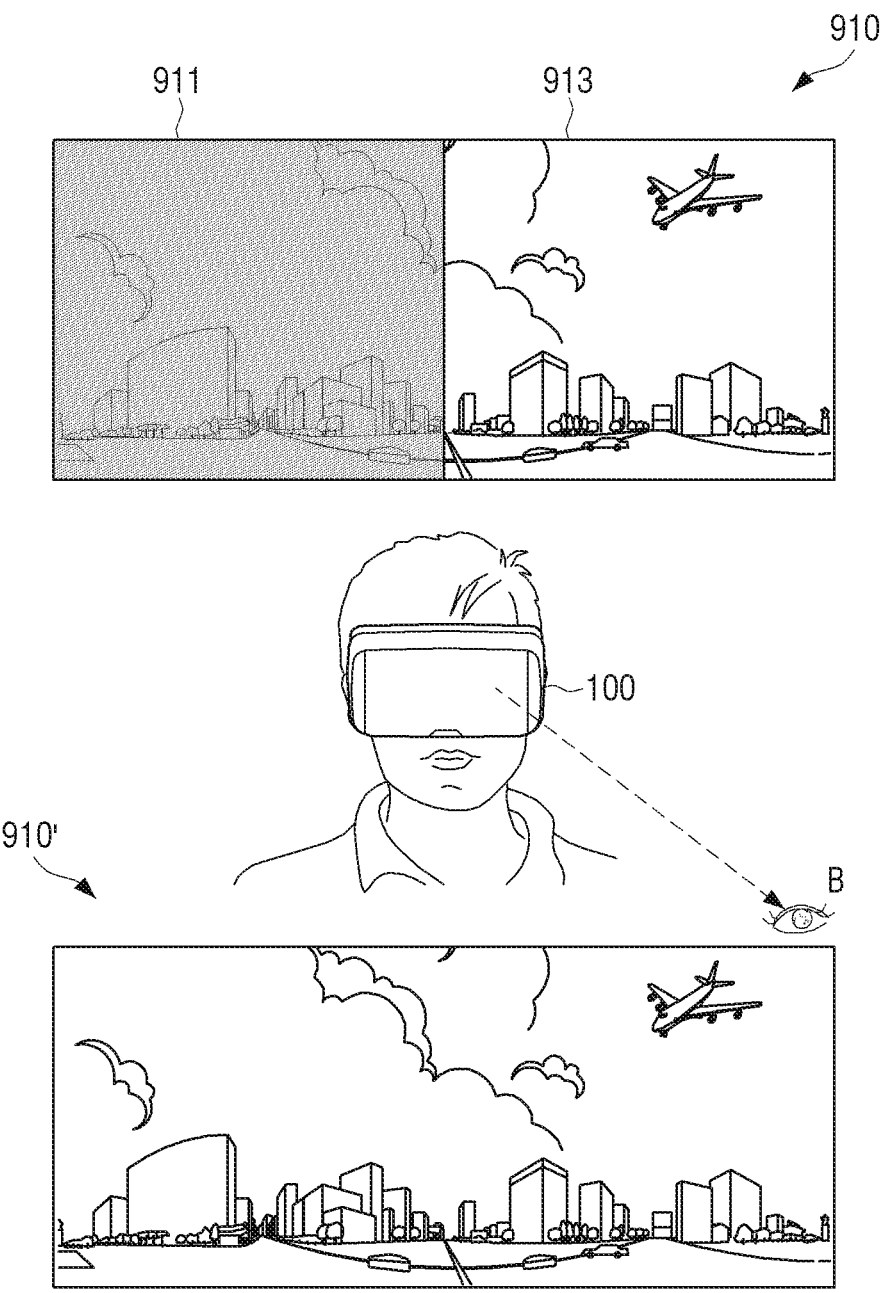
FIG. 9 is a diagram illustrating an electronic apparatus for providing a VR environment, which displays a panorama image reconstructed according to a second gaze of a user, according to an example embodiment.

FIG. 9 is a diagram illustrating an electronic apparatus for providing a VR environment, which displays a panorama image reconstructed according to a second gaze of a user, according to an example embodiment.

As illustrated in FIG. 9, the electronic apparatus 100 for providing a VR environment displays a panorama image 910 including first and second images 911, 913 in response to a user command. While displaying the panorama image 910, the electronic apparatus 100 senses the user's gaze. When the result of sensing indicates that the user is gazing at area B, the electronic apparatus 100 acquires the image setting value of the second image 913 corresponding to the area B the user is gazing at among the first and second constituent images 911, 913 of the panorama image 910. Then the electronic apparatus 100 generates a panorama image by performing image processing on the first constituent image 911 of the panorama image 910, by using the image setting value of the second image 913.

Accordingly, the electronic apparatus 100 displays a panorama image 910' reconstructed with the first image 911 that is image-processed based on the image setting value of the second image 913 corresponding to the area B the user is gazing at, and the second image 913 corresponding to the area B.

Figure 10:
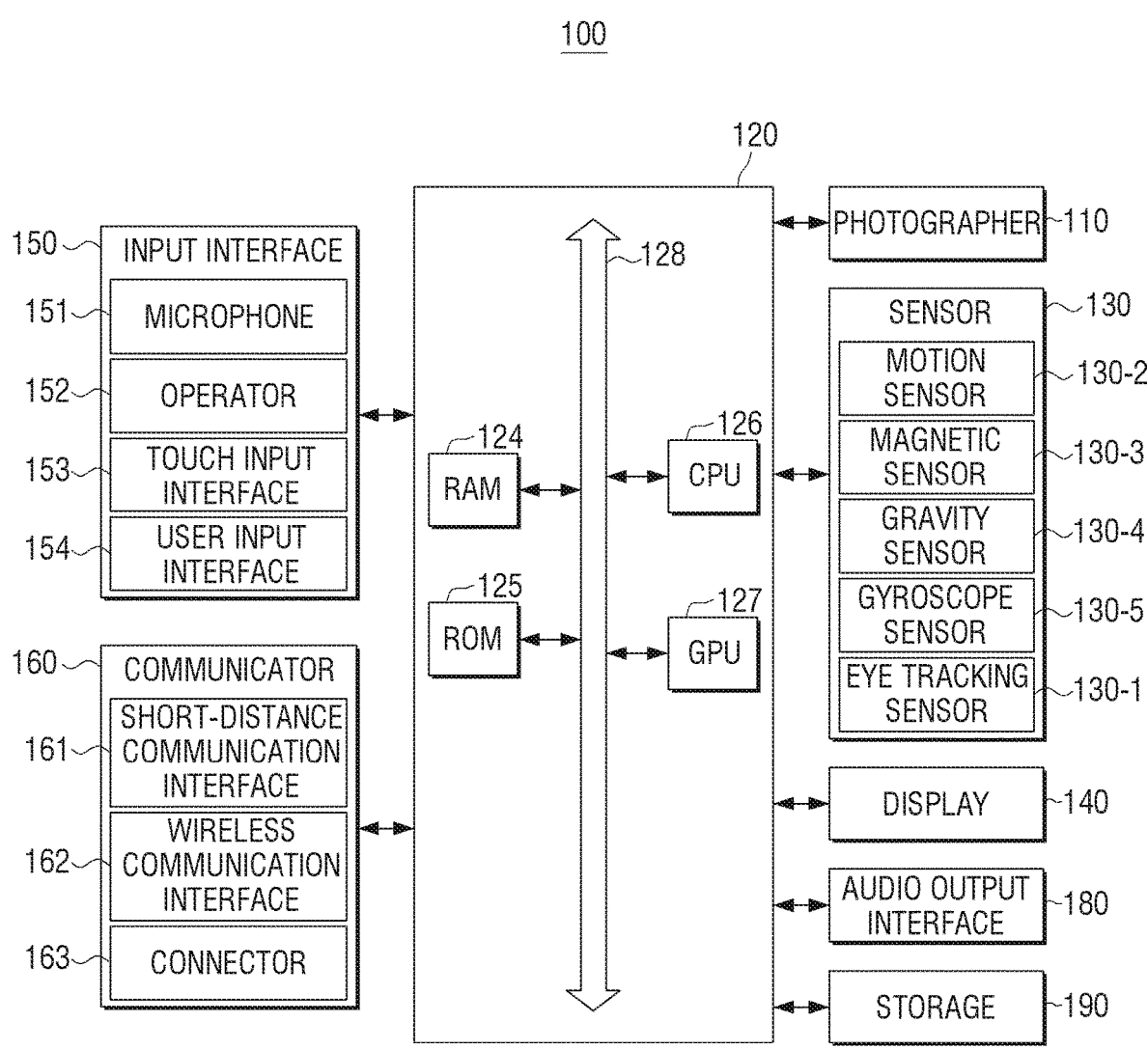
FIG. 10 is a detailed block diagram of an electronic apparatus according to an example embodiment.

The electronic apparatus 100 described above may be implemented as a smartphone, a multimedia device, and so on that includes the first and second cameras 110-1, 110-2, and may include configurations as illustrated in FIG. 10 in addition to the configurations described above.

FIG. 10 is a detailed block diagram of an electronic apparatus according to an example embodiment.

As illustrated in FIG. 10, in addition to a photographer 110 including the first and second cameras 110-1, 110-2, the processor 120, the sensor 130, and the display 140 described above, the electronic apparatus 100 further includes an input interface 150, a communicator 160, an audio output interface 180, and a storage 190.

The input interface 150 may receive a variety of user commands and deliver them to the processor 120, and may include a microphone 151, an operator 152, a touch input interface 153, and a user input interface 154.

The microphone 151 may receive user's voice command, and the operator 152 may be implemented as a keypad provided with a variety of function keys, number keys, special keys, text keys, and so on. The touch input interface 153 may be implemented as a touchpad that constructs an interlayered structure with the display 140 described above. In this example, the touch input interface 153 may receive a command to select icons associated with a variety of applications displayed.

The user input interface 154 may receive an infrared (IR) signal or radio frequency (RF) signal to control the operation of the electronic apparatus 100, from at least one peripheral device such as a remote control apparatus.

The communicator 160 performs data communication with at least one user terminal device. When the electronic apparatus 100 is in communication with a photographing apparatus configured to photograph images through a plurality of cameras, the communicator 160 may receive images photographed through a plurality of cameras and photograph setting values of the images photographed through a plurality of cameras. In the above example, the processor 120 may reset the photograph setting values to be applied to a plurality of cameras included in the photographing apparatus, based on the photograph setting values received through the communicator 160, and transmit the reset photograph setting values to the photographing apparatus through the communicator 160. Furthermore, the communicator 160 may transmit control information to control photographing operation of the photographing apparatus, to the photographing apparatus.

The communicator 160 described above may include any one or any combination of a connector 163, a wireless communication interface 162 such as a short-distance communication interface 161, a wireless LAN interface, and so on, or a wired communication interface such as high-definition multimedia interface (HDMI), universal serial bus (USB), Institute of Electrical and Electronic Engineers (IEEE) 1394, and so on.

The short-distance communication interface 161 is configured to wirelessly perform short-distance communication between the electronic apparatus 100 and neighboring user terminal devices or photographing apparatuses. The short-distance communication interface 161 as described above may include any one or any combination of a Bluetooth interface, an infrared data association (IrDA) interface, a near field communication (NFC) interface, a Wi-Fi interface, and a Zigbee interface.

Further, the wireless communication interface 162 is connected to external networks and performs communication according to wireless communication protocol such as IEEE, and so on. The wireless communication interface may further include a mobile communication interface that can connect to mobile communication networks, and perform communication under a variety of mobile communication standards such as 3rd Generation (3G), 3rd Generation Partnership Project (3GPP), Long Term Evolution (LTE), and so on.

As described above, the communicator 160 may be implemented by a variety of short-distance communication methods described above, or may employ other communication technologies not mentioned herein.

The connector 163 is configured to provide an interface with a variety of source devices, such as USB 2.0, USB 3.0, HDMI, IEEE 1394, and so on. The connector 163 may receive content data transmitted from an external server via a wired cable connected to the connector 163, or transmit previously stored content data to an external recording media, in response to a control command from the processor 120. Further, the connector 163 may receive power from a power source through a wired cable that is physically connected to the connector 163.

The audio output interface 180 outputs the audio data signal-processed at the signal processor 160 through a speaker.

The storage 190 may store image content such as images photographed from the first and second cameras 110-1, 110-2, and a panorama image generated from the respective images, or store image and audio data of the content received from external server. Furthermore, the storage 190 may additionally store an operating program to control the operations of the electronic apparatus 100. The 'operating program' as used herein may include a program that is read from the storage 190 and compiled to operate the respective components of the electronic apparatus 100, upon a turn-on of the electronic apparatus 100.

The sensor 130 described above may include a sensor capable of user's eye tracking, and a sensor to sense a motion of the electronic apparatus 100. Depending on example embodiments, the sensor 130 may include any one or any combination of an eye tracking sensor 130-1 capable of tracking user's iris, a motion sensor 130-2 capable of sensing a motion of the electronic apparatus 100, a magnetic sensor 130-3, a gravity sensor 130-4, and a gyroscope sensor 130-5.

The eye tracking sensor 130-1 refers to a sensor that is positioned near to a user's eyeball to sense a change in the user's gaze while photographing iris of the user.

Accordingly, the processor 120 determines an area the user is gazing at among the displayed panorama image, based on the sensing information sensed through the eye tracking sensor 130-1. Then the processor may generate an image-processed panorama image by performing image processing on the rest of the images, by using the image setting value of the image that the user is gazing at among a plurality of constituent images of the displayed panorama image.

The motion sensor 130-2 may be an accelerometer sensor that measures an acceleration or a magnitude of impact to the electronic apparatus 100 in motion.

The magnetic sensor 130-3 may refer to a sensor such as an electronic compass that can detect azimuth angles, using terrestrial magnetic field, which is used in application such as smartphone, radio set, GPS, PDA, navigation instruments, and so on.

The gravity sensor 130-4 refers to a sensor that detects a direction of the gravity, which is automatically rotated according to the direction of motion of the display 100, to sense the direction.

The gyroscope sensor 130-5 refers to a sensor that aids more precise and accurate recognition of a motion, by adding rotations to the motion sensor 130-2 to thus enable six-axis direction recognition.

Accordingly, when a video is photographed through the first and second cameras 110-1, 110-2, the processor 120 may acquire the photograph setting values of the first and second cameras 110-1, 110-2 at a time of occurrence of an event of sensing a motion of the electronic apparatus 100 through any one or any combination of the motion sensor 130-2, magnetic sensor 130-3, gravity sensor 130-4, and gyroscope sensor 130-5 described above.

In example embodiments, the sensor 130 may additionally include a proximity sensor for use in determining whether an object is in a proximity to another object before the two are contacted, an optical sensor configured to sense a received light and convert this into electric signal, and so on.

The processor 120 described above includes a RAM 124, a ROM 125, a CPU 126, and a GPU 127, and the RAM 124, the ROM 125, and the CPU 126 are connected with one another via bus 128.

The CPU 126 accesses the storage 190 and performs booting by using OS stored in the storage 190. Further, the CPU 126 performs a variety of operations by using various programs, contents, data, and so on stored in the storage 190.

The GPU 127 generates a display screen that includes a variety of objects including icons, images, texts, and so on. Based on a received control command, the GPU 127 computes attribute values such as coordinates, shapes, sizes, colors, and so on, with which the respective objects will be displayed according to a layout of the screen, and generates a display screen in a variety of layouts that include objects, based on the computed attribute values.

The ROM 125 stores a set of instructions for system booting. When power is supplied in response to turn-on command, according to the instruction stored in the ROM 125, the CPU 126 copies the OS stored in the storage 190 onto the RAM 124 and executes the OS to boot up the system. When booting is completed, the CPU 126 copies programs stored in the storage 190 onto the RAM 124 and executes the copied programs to perform corresponding operations.

The processor 120 as described above may be combined with the respective components described above to be implemented as a system-on-a-chip (SOC) or system on chip (SoC).

The operation of the processor 120 described above may be achieved by the program stored in the storage 190. The storage 190 may be implemented as any one or any combination of a memory card (e.g., SD card, memory stick) attachable to/removable from the ROM 125, the RAM 124, or the electronic apparatus 100, non-volatile memory, volatile memory, a hard disk drive (HDD), or a solid state drive (SSD).

The configurations of the electronic apparatus 100 according to example embodiments have been described above.

Hereinbelow, a method for controlling the operation of the electronic apparatus 100, according to example embodiments, will be described in detail.

Figure 11:
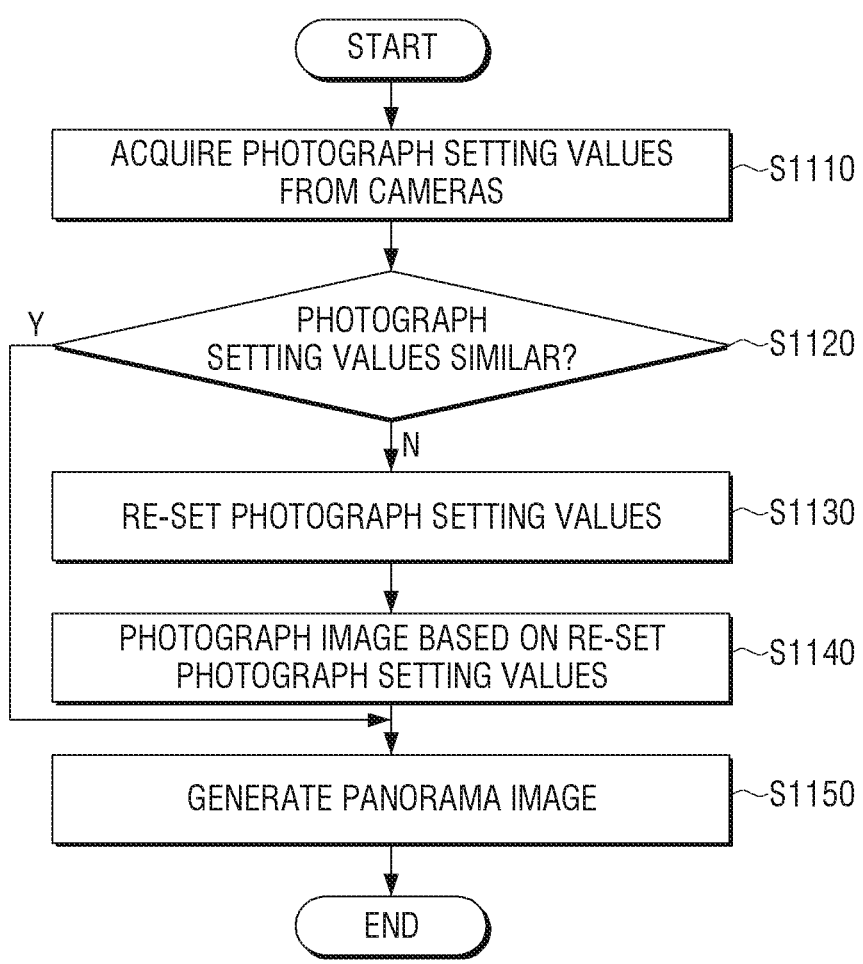
FIG. 11 is a flowchart provided to explain a method for photographing a panorama image at an electronic apparatus, using a plurality of cameras, according to an example embodiment.

FIG. 11 is a flowchart provided to explain a method for photographing a panorama image at an electronic apparatus, using a plurality of cameras, according to an example embodiment.

As illustrated in FIG. 11, the electronic apparatus 100 includes a plurality of cameras (hereinbelow, 'first and second cameras').

At S1110, when images are photographed through the first and second cameras, the electronic apparatus 100 acquires photograph setting values of the images photographed, from the first and second cameras. The photograph setting values may include either one or both of photograph exposure value and photograph color value of the first and second cameras.

The electronic apparatus 100 may control the photographing operations of the first and second cameras through the ISP, and may acquire the preset photograph setting values for the first and second cameras while simultaneously performing signal processing for the images photographed from the first and second cameras.

The first and second cameras may include a lens, a shutter, an iris, a solid state imaging device, an analog front end (AFE), and an image sensor. The shutter regulates the time of a reflective light from the object entering the image sensor, and the iris regulates a quantity of light entering the lens by mechanically increasing or decreasing the size of an aperture where the light enters. The solid state imaging device outputs a photocharge image into electric signals, when the reflective light from the object is accumulated into photocharges. The AFE samples and digitizes the electric signals outputted from the solid state imaging device.

Accordingly, the ISP signal-processes the electric signals for the photographed images outputted through the first and second cameras, into digital signals. Using the respective components described above, the first and second cameras may generate photograph parameters for the photographed images, including exposure time information, ISP information, brightness information, color information, white balance information, and so on, and output the generated photograph parameters to the ISP.

Accordingly, by referring to the photograph parameters generated from the first and second cameras, the ISP may acquire photograph setting values including photograph exposure value, photograph color value, and so on, for the images photographed from the first and second cameras.

The ISP may be composed of one single ISP or may be composed of ISPs corresponding in number to the number of first and second cameras. When the ISP is composed of one single ISP, the ISP may alternately control the photographing operation of the first and second cameras, and when the ISP is composed of ISPs corresponding in number to the number of first and second cameras, then each of the ISPs may control the photographing operation of the respective cameras corresponding to the ISPs.

When the photograph setting values of the first and second cameras are acquired through the ISP described above, at S1120, the electronic apparatus 100 determines whether or not the acquired photograph setting values of the first and second cameras are similar to each other.

The electronic apparatus 100 determines whether a difference between photograph setting values acquired from the first and second cameras is in a preset threshold range. When the result of determination indicates that the difference between the photograph setting values acquired from the first and second cameras is in the preset threshold range, the electronic apparatus 100 determines that the photograph setting values of the first and second cameras are similar. When the determination indicates that the photograph setting values of the first and second cameras are similar, at S1150, the electronic apparatus 100 generates a panorama image or VR image from the images photographed, based on the photograph setting values previously applied to the first and second cameras, which will be described below.

When the difference of the photograph setting values acquired from the first and second cameras is outside the preset threshold range, at S1130, the electronic apparatus 100 determines that the photograph setting values of the first and second cameras are different, and resets the photograph setting values to be applied to either one or both of the first and second cameras, based on the example embodiments described below.

The electronic apparatus 100 may reset the photograph setting values of either one or both of the first and second cameras, based on the photograph setting values of the first and second cameras through the DSP.

In an example embodiment, the electronic apparatus 100 may reset the photograph setting values of the first and second cameras by an average value of the photograph setting values of the first and second cameras.

In another example embodiment, the electronic apparatus 100 may reset the photograph setting values of the first and second cameras by an average value calculated from the highest photograph setting value of the photograph setting values of the first and second cameras and an average value of the photograph setting values of the first and second cameras.

In yet another example embodiment, the electronic apparatus 100 may rest the photograph setting values of the first and second cameras by an average value calculated from the lowest photograph setting value of the photograph setting values of the first and second cameras and an average value of the photograph setting values of the first and second cameras.

In yet another example embodiment, the electronic apparatus 100 may reset the photograph setting values of the other cameras by the photograph setting value of the user-selected camera among the first and second cameras.

In yet another example embodiment, the electronic apparatus 100 may reset the photograph setting value acquired from the first camera as the first photograph setting value, and reset the photograph setting value acquired from the second camera as the second photograph setting value.

When the photograph setting values of either one or both of the first and second cameras is reset according to example embodiments described above, at S1140, the electronic apparatus 100 photographs images, using the first and second cameras, based on the reset photograph setting values. That is, the electronic apparatus 100 controls the first and second cameras through at least one ISP, and the first and second cameras may photograph images in response to a control command from the ISP and based on the reset photograph setting values.

At S1150, when the images are photographed through the first and second cameras, based on the reset photograph setting values, the electronic apparatus 100 generates a panorama image or VR image by using a plurality of images photographed through the first and second cameras.

In an example embodiment in which the electronic apparatus 100 resets the photograph setting values to be applied to either one or both of the first and second cameras, based on the photograph setting values acquired from the first and second cameras, when the electronic apparatus 100 photographs video through the first and second cameras, the electronic apparatus 100 may acquire the photograph setting values set for the first and second cameras, based on the example embodiments described above.

In an example embodiment, when the electronic apparatus 100 photographs video through the first and second cameras, the electronic apparatus 100 may acquire photograph setting values from the image frames of the video photographed through the first and second cameras at preset time intervals.

In another example embodiment, when the electronic apparatus 100 photographs video through the first and second cameras, the electronic apparatus 100 may determine, based on the sensing information sensed through the sensor, whether or not an event of sensing a motion of the electronic apparatus 100 occurs, and acquire again the photograph setting values of the first and second cameras, based on the result of such determination.

When the photograph setting values of either one or both of the first and second cameras is reset, it is possible to photograph images with the same exposure value or color value, based on the reset photograph setting values. Accordingly, the electronic apparatus 100 can generate a panorama image or VR image by using respective images photographed from the first and second cameras, based on the reset photograph setting values.

As described above, the electronic apparatus 100 can minimize an error in the exposure value or color value among images photographed from the first and second cameras, by resetting the photograph setting values of the first and second cameras, based on example embodiments described above. Furthermore, the electronic apparatus 100 can generate a natural overall panorama image or VR image, by generating the panorama image or VR image by using the images photographed at the first and second cameras, based on the reset photograph setting values.

Hereinbelow, a method of an electronic apparatus 100 for providing a VR environment to provide a panorama image, according to an example embodiment, will be described in detail below.

Figure 12:
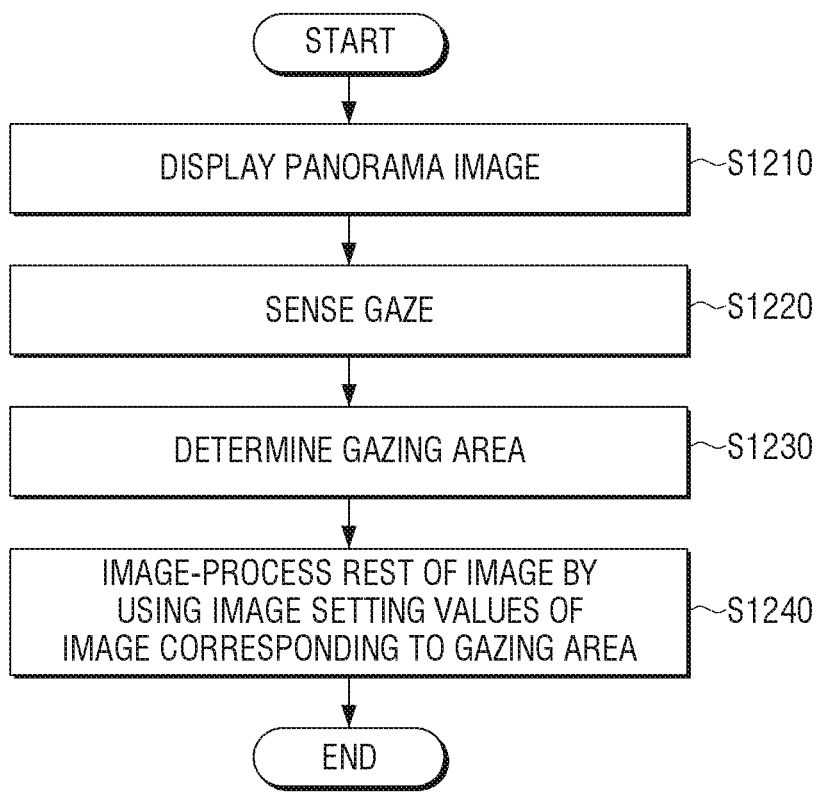
FIG. 12 is a flowchart provided to explain a method for providing a panorama image at an electronic apparatus for providing a VR environment, according to an example embodiment.

FIG. 12 is a flowchart provided to explain a method for providing a panorama image at an electronic apparatus for providing a VR environment, according to an example embodiment.

As illustrated in FIG. 12, at S1210, the electronic apparatus 100 displays a panorama image requested by a user in a VR environment. The panorama image may be composed of a plurality of images. However, example embodiments are not limited to the example provided above, and accordingly, the electronic apparatus 100 may generate a VR image, which may be a 360 degree around view image, with a plurality of images, and display the generated VR image.

When a panorama image composed of a plurality of images is displayed, at S1220, the electronic apparatus 100 senses the user's gaze. In an example, the electronic apparatus 100 may use the sensor such as eye tracking sensor to sense a location in a direction the user is gazing, and track the location in the direction the user is gazing, based on the sensed location.

At S1230, when the user's gaze is sensed through the sensor described above, the electronic apparatus 100 determines an area of the panorama image that the user is gazing, based on the sensed gaze information. Then, at S1240, the electronic apparatus 100 performs image-processing rest of the image(s) by using the image setting values of the image corresponding to the area the user is gazing at, among the constituent images of the panorama image, and generates an image-processed panorama image.

In an example embodiment, when determining that the area the user is gazing at is the first area, the electronic apparatus 100 acquires the image setting value of the first image of the panorama image that corresponds to the first area. Then the electronic apparatus 100 may perform image processing for the second constituent image of the panorama image, by using the acquired image setting value of the first image.

Then the electronic apparatus 100 may generate a panorama image by compositing the first image corresponding to the first area and the second image that is image-processed based on the image setting value of the first image.

In another example embodiment, when determining that the area the user is gazing at is moved from the first area to the second area, the electronic apparatus 100 acquires an image setting value of the first image corresponding to the first area at which the user is gazing among a plurality of constituent images of the panorama image. Then the electronic apparatus 100 may perform image processing of the second image corresponding to the second area in the panorama image, by using the acquired image setting value for the first image.

In yet another example embodiment, the electronic apparatus 100 may determine that the user is gazing in between the first and second areas. For example, the user may be gazing at the first and second images among a plurality of constituent images of the panorama image. When sensing the gaze information from such user's gaze, the electronic apparatus 100 may determine from the sensed gaze information that the user is gazing at the first area corresponding to the first image and the second area corresponding to the second image. Accordingly, when determining that the user is gazing at the first and second areas respectively corresponding to the first and second images, the electronic apparatus 100 acquires the image setting value included in the metadata of the first and second images, respectively. Then the electronic apparatus 100 calculates a median value from the image setting values respectively corresponding to the first and second images, and perform image processing for the first and second images by using the calculated median value.

Then the electronic apparatus 100 may generate a panorama image by compositing the first image corresponding to the first area and the second image that is image-processed based on the image setting value of the first image.

Accordingly, the electronic apparatus 100 can compensate the image processing among the image associated with the user's gaze and the neighboring images, by compensating the neighboring images with the image setting value of the image associated with the user's gaze. As a result, it is possible to minimize the sense of difference among a plurality of constituent images of the panorama image. That is, according to an example embodiment, the electronic apparatus 100 compensates the neighboring images, based on the image according to the direction of the user's gaze, such that continuity among a plurality of constituent images of the panorama image can be ensured.

The controlling method of the electronic apparatus for providing a panorama image described above may be implemented to be one or more programs that may be stored in non-transitory computer readable recording medium.

The non-transitory computer readable recording medium is a medium that stores data semi-permanently, and can be read by devices, rather than a medium storing data temporarily such as register, cache, or memory. The above various programs may be stored in various types of recording medium readable by a terminal, such as, a Random Access Memory (RAM), a flash memory, a Read Only Memory (ROM), an Erasable Programmable ROM (EPROM), an Electronically Erasable and Programmable ROM (EEPROM), a register, a hard disk, a removable disk, a memory card, an USB memory, a CD-ROM, and so on.

The foregoing example embodiments and advantages are examples and are not to be construed as limiting the example embodiments. The present teaching can be readily applied to other types of apparatuses. Also, the description of the example embodiments of the present inventive concept is intended to be illustrative, and not to limit the scope of the claims.

What is claimed is:

1. A method of an electronic apparatus for providing a panorama image, the method comprising:
   acquiring photograph exposure values respectively of first images that are photographed respectively through a plurality of cameras;
   determining whether a difference between the photograph exposure values acquired respectively from the plurality of cameras is outside a preset threshold range;
   based on the difference between the acquired photograph exposure values being determined to be within the preset threshold range, maintaining the acquired photograph exposure values;
   based on the difference between the acquired photograph exposure values being determined to be outside the preset threshold range:
      displaying an icon for a reference camera setting;
      based on a selection of the displayed icon for the reference camera setting, displaying a list comprising objects respectively corresponding to the plurality of cameras, while displaying the icon for the reference camera setting; and
      based on a selection of one of the objects included in the displayed list, resetting at least one of the photograph exposure values to be applied to at least one of the plurality of cameras, by a reference one of the photograph exposure values of a reference camera corresponding to the selected one of the objects among the plurality of cameras; and
   generating the panorama image comprising second images that are photographed respectively through the plurality of cameras using the reset at least one of the photograph exposure values.

2. The method of claim 1, wherein the resetting comprises resetting the photograph exposure values to be respectively used by the plurality of cameras, by an average value of the acquired photograph exposure values of the plurality of cameras.

3. The method of claim 1, wherein the resetting comprises resetting a photograph exposure value acquired from a first camera among the plurality of cameras as a first photograph exposure value, and resetting a photograph exposure value acquired from a second camera as a second photograph exposure value.

4. The method of claim 1, wherein the acquiring comprises acquiring, at a preset time interval, the photograph exposure values respectively from image frames of a video that is photographed through the plurality of cameras.

5. The method of claim 4, further comprising:
sensing a motion of the electronic apparatus; and
reacquiring the photograph exposure values respectively from the image frames of the photographed video, based on the sensed motion of the electronic apparatus.

6. The method of claim 1, wherein each of the photograph exposure values comprises either one or both of a photograph exposure value and a photograph color value.

7. The method of claim 1, wherein the acquiring comprises acquiring, by an image signal processor (ISP), the photograph exposure values respectively of the plurality of cameras,
wherein the resetting comprises resetting, by a digital signal processor (DSP), the at least one of the photograph exposure values to be applied to the at least one of the plurality of cameras, and
wherein the method further comprises photographing, by a camera, the second images, using the reset at least one of the photograph exposure values, based on a control command received from the ISP.

8. An electronic apparatus for providing a panorama image, the electronic apparatus comprising:
a plurality of cameras configured to photograph first images; and
a processor configured to:
acquire photograph exposure values respectively of the first images photographed respectively through the plurality of cameras;
determine whether a difference between the photograph exposure values acquired respectively from the plurality of cameras is outside a preset threshold range;
based on the difference between the acquired photograph exposure values being determined to be within the preset threshold range, maintain the acquired photograph exposure values;
based on the difference between the acquired photograph exposure values being determined to be outside the preset threshold range:
control to display an icon for a reference camera setting;
based on a selection of the displayed icon for the reference camera setting, control to display a list comprising objects respectively corresponding to the plurality of cameras, while displaying the icon for the reference camera setting; and
based on a selection of one of the objects included in the displayed list, reset at least one of the photograph exposure values to be applied to at least one of the plurality of cameras, by a reference one of the photograph exposure values of a reference camera corresponding to the selected one of the objects among the plurality of cameras, the at least one of the photograph exposure values comprising either one or both of a photograph exposure value and a photograph color value;
control the plurality of cameras to respectively photograph second images, using the reset at least one of the photograph exposure values; and
generate the panorama image comprising the photographed second images.

9. The electronic apparatus of claim 8, wherein the processor is configured to reset the photograph exposure values to be respectively used by the plurality of cameras, by an average value of the acquired photograph exposure values of the plurality of cameras.

10. The electronic apparatus of claim 8, wherein the processor is further configured to reset a photograph exposure value acquired from a first camera among the plurality of cameras as a first photograph exposure value, and reset a photograph exposure value acquired from a second camera as a second photograph exposure value.

11. The electronic apparatus of claim 8, wherein the processor is further configured to acquire, at a preset time interval, the photograph exposure values respectively from image frames of a video photographed through the plurality of cameras.

12. The electronic apparatus of claim 11, further comprising a sensor configured to sense a motion of the electronic apparatus,
wherein the processor is further configured to reacquire the photograph exposure values respectively from the image frames of the photographed video, based on the sensed motion of the electronic apparatus.

13. The electronic apparatus of claim 8, wherein the processor comprises:
an image signal processor (ISP) configured to acquire the photograph exposure values respectively of the plurality of cameras and signal-process image data for the photographed first images; and
a digital signal processor (DSP) configured to reset the at least one of the photograph exposure values to be applied to the at least one of the plurality of cameras,
wherein the ISP is further configured to control the plurality of cameras to photograph the second images, using on the reset at least one of the photograph exposure values.

* * * * *